United States Patent
Yamamoto et al.

(10) Patent No.: US 10,152,260 B2
(45) Date of Patent: Dec. 11, 2018

(54) INFORMATION SYSTEM, MANAGEMENT PROGRAM, AND PROGRAM EXCHANGE METHOD OF INFORMATION SYSTEM

(71) Applicant: HITACHI, LTD., Tokyo (JP)

(72) Inventors: Akira Yamamoto, Tokyo (JP); Takahiro Yamamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/932,214

(22) Filed: Feb. 16, 2018

(65) Prior Publication Data

US 2018/0246663 A1 Aug. 30, 2018

Related U.S. Application Data

(63) Continuation of application No. PCT/JP2017/007719, filed on Feb. 28, 2017.

(51) Int. Cl.
*G06F 3/06* (2006.01)
*G06F 8/61* (2018.01)

(52) U.S. Cl.
CPC .......... *G06F 3/0631* (2013.01); *G06F 3/0604* (2013.01); *G06F 3/067* (2013.01); *G06F 3/0644* (2013.01); *G06F 3/0665* (2013.01); *G06F 8/61* (2013.01)

(58) Field of Classification Search
CPC ........ G06F 8/61; G06F 3/0631; G06F 3/0604; G06F 3/0644; G06F 3/0665; G06F 3/0667; G06F 3/0607; G06F 3/0646
See application file for complete search history.

(56) References Cited

U.S. PATENT DOCUMENTS 6,098,129 A   8/2000   Fukuzawa et al.
9,678,680 B1*  6/2017  Natanzon ............... G06F 3/0619
2008/0244196 A1* 10/2008  Shitomi ................ G06F 3/0605
                                                           711/147

(Continued)

FOREIGN PATENT DOCUMENTS

JP   10-283272 A    10/1998
JP   2009-230577 A  10/2009
JP   2013-517539 A   5/2013

OTHER PUBLICATIONS

International Search Report with Written Opinion of ISA of PCT/JP2017/007719 dated May 23, 2017 and English Translation of Written Opinion.

*Primary Examiner* — Michael Krofcheck
(74) *Attorney, Agent, or Firm* — Mattingly & Malur, PC

(57) ABSTRACT

An information system according to one embodiment of this invention includes a first computer which is an SDS (Software Defined Storage) having a virtualization function and a second computer which is an SDS. The first computer can provide a logical volume using a volume in the second computer as a storage region by the virtualization function. When the information system receives a direction to install a storage control program to the second computer, the information system specifies the logical volume using the volume of the second computer as the storage region among logical volumes in the first computer, and then moves data stored in the volume of the second computer used by the specified logical volume as the storage region to a storage device in the first computer. Thereafter, the storage control program is installed in the second computer.

24 Claims, 17 Drawing Sheets

(56) References Cited

U.S. PATENT DOCUMENTS

2009/0241100 A1    9/2009  Sakurai et al.
2011/0270945 A1   11/2011  Shiga et al.
2012/0117555 A1*   5/2012  Banerjee .................. G06F 8/65
                                                     717/168

* cited by examiner

I/O REQUEST (READ COMMAND, WRITE COMMAND) 400

LOGICAL VOLUME INFORMATION 2000

REAL PAGE INFORMATION 2100

STORAGE DEVICE INFORMATION 2500

STORAGE DEVICE GROUP INFORMATION 2300

FREE PAGE MANAGEMENT INFORMATION QUEUE 2201

INFORMATION SYSTEM, MANAGEMENT PROGRAM, AND PROGRAM EXCHANGE METHOD OF INFORMATION SYSTEM

TECHNICAL FIELD

The present invention relates to a computer and particularly relates to an information system containing a computer operating as an SDS (Software Defined Storage).

BACKGROUND ART

As a technique for reducing the management cost of a storage system (storage apparatus), a virtualization technique of a storage system is mentioned. This technique realizes unified management of various kinds of storage systems different in the management method by this virtualization technique to thereby reduce the management cost and increase the user-friendliness of the storage systems.

Patent Document 1 relates to the virtualization technique of the storage system. Patent Document 1 discloses a computer system in which a second storage system is connected to a first storage system connected to a host computer. The computer system provides a volume of the second storage system as a volume of the first storage system to the host computer. In this configuration, the second storage system is concealed from the host computer, and all read/write requests of the host computer are issued to the first storage system. When the read/write requests received from the host computer are performed to the volume of the second storage system, the first storage system issues the requests to the second storage system to cause the second storage system to execute the read/write requests. Thus, an administrator of the storage may manage substantially only the first storage system, so that the management man-hours of the storage system can be sharply reduced.

On the other hand, a technique referred to as an SDS (Software Defined Storage) has drawn attention in recent years. The technique is a technique of realizing functions of the storage system by software operable in a general purpose server. Heretofore, a vendor has provided a storage as a dedicated device (software+hardware). However, when the SDS is provided, a vendor provides only software for the SDS (which is referred to as a storage control program in this specification) to a user, and then the user installs the software in hardware (general purpose server) prepared by himself/herself to thereby achieve building of a storage system.

CITATION LIST

Patent Document

Patent Document 1: Japanese Patent Application Laid-Open No. 10-283272

SUMMARY OF THE INVENTION

Problem to be Solved by the Invention

The specification (function and the like) of the SDS may vary depending on a storage control program to be installed in a general purpose server. Therefore, in an environment where various kinds of SDSs coexist, a problem of the complexity of management may arise as with a former storage system composed of a dedicated device.

However, in the case of the SDS, a user also can freely select (exchange) the storage control program which the user installs in the SDS. Therefore, when various kinds of SDSs coexist in the system environment of a user, the complexity of management can be eliminated by exchanging the program of the SDS to one suitable for the intended use of the user in some cases.

However, different kinds of SDSs are different in formats of data to be stored in the SDSs in some cases. Therefore, when the storage control program installed in the SDS is replaced by a new storage control program, data already stored in the SDS cannot be accessed, which results in a state where the data is substantially lost. Therefore, a technique of replacing programs without losing the existing data has been demanded.

Means for Solving the Problems

An information system according to one embodiment of the present invention contains a first computer which is an SDS (Software Defined Storage) having a virtualization function and a second computer which is an SDS. The first computer can provide a logical volume using a volume in the second computer as a storage region by the virtualization function. When receiving a direction to install a storage control program to the second computer, the information system specifies the logical volume using the volume of the second computer as the storage region among logical volumes in the first computer, and then moves data stored in a volume in the second computer used by the specified logical volume as the storage region to a storage device in the first computer. Thereafter, the storage control program is installed in the second computer.

Advantageous Effect of the Invention

The present invention enables exchange of programs of an SDS while maintaining data.

MODES FOR CARRYING OUT THE INVENTION

Figure 1:
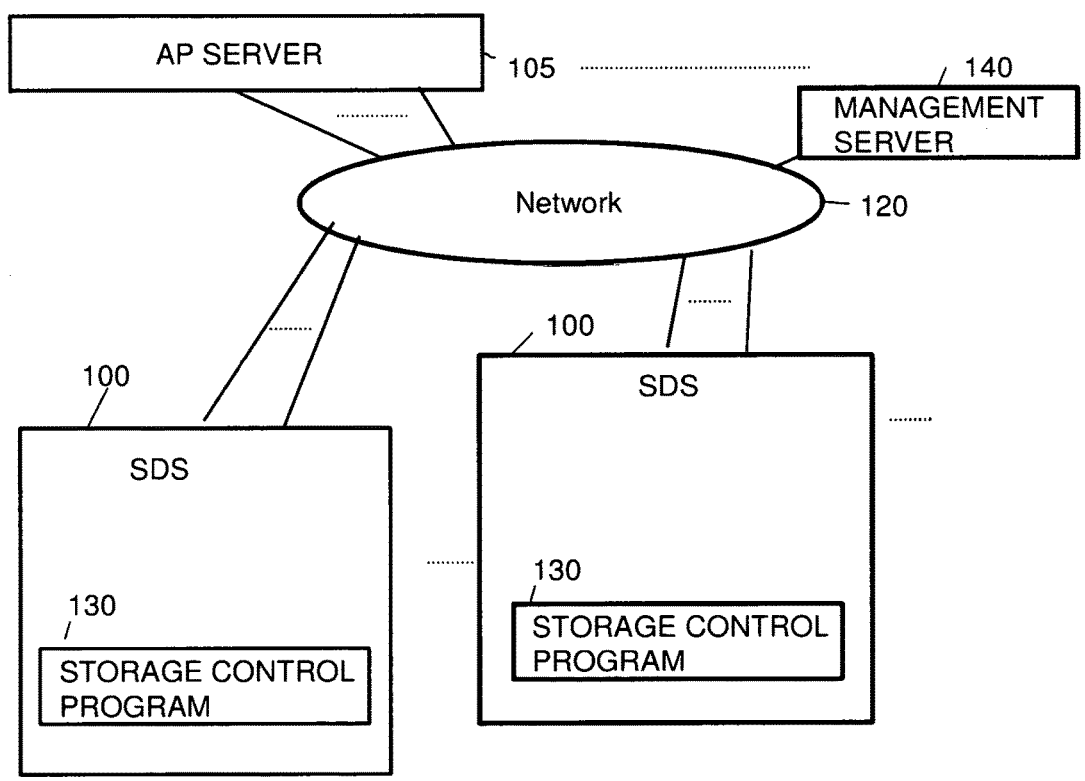
FIG. 1 is a view illustrating the configuration of an information system in this embodiment.

Hereinafter, embodiments of the present invention are described with reference to the drawings. The embodiments described below do not limit the invention according to Claims and all the elements and combinations thereof described in the embodiments are not necessarily indispensable for the solution means of the invention.

Before starting the description of the embodiments, various terms used in the embodiments are described.

In the embodiments described below, an SDS (Software Defined Storage) is a word used as the antonym of an existing storage apparatus. An existing storage apparatus is composed of dedicated hardware in many cases. In the embodiments described below, the existing storage apparatus (i.e., storage apparatus composed of dedicated hardware) is referred to as a "conventional storage apparatus" unless otherwise particularly specified.

To the contrary, a storage apparatus composed without using dedicated hardware, specifically an apparatus composed of a general purpose computer, such as a personal computer (PC), in which software (computer program) for realizing a function of a storage apparatus is implemented, is referred to as an "SDS (Software Defined Storage)".

In the embodiments described below, the "storage apparatus" is used as a word meaning both the conventional storage apparatus and the SDS. For example, when functions or features, which the conventional storage apparatus and the SDS have in common, is described, the word of "storage apparatus" is used.

The "volume" means a storage space which target devices, such as the storage apparatus and a storage device, provide to initiators, such as host computers. When the initiator issues an access request, e.g., a data read request, to a region on a volume, the target device providing the volume reads data from a area (referred to as a physical region) on the target device assigned to the region, and then returns the same to the initiator.

Some storage apparatuses can provide a virtual volume formed by a so-called Thin Provisioning technique as the volume to an initiator. In the embodiments described below, the function of providing the virtual volume to the initiator is referred to as a "Thin Provisioning function".

In the virtual volume, a storage device is not assigned to a region on the storage space in the initial state (immediately after defined). At the time when the initiator issues a data write request to the region on the storage space, the storage apparatus dynamically determines a storage device assigned to the region. The SDS in the embodiments described below can provide the virtual volume to the initiator.

The "volume virtualization function" (or simply referred to as a "virtualization function") is a function of providing a volume of another storage apparatus as its own logical volume to an initiator device. The volume virtualization function is provided while being implemented in a dedicated device (referred to as a virtualization appliance), for example. Or, the storage apparatus has the volume virtualization function in some cases. The embodiments described below describe an example in which the SDS has the volume virtualization function.

EMBODIMENTS

FIG. 1 illustrates the configuration of the information system in this embodiment. The information system has a plurality of server computers (100, 105, 140) and is composed by interconnection of the server computers (100, 105, 140) through a network 120. Each server computer (100, 105, 140) is a general purpose computer, such as a personal computer, and has basically the same hardware architecture. However, the hardware architecture of each server computer (100, 105, 140) may not necessarily be completely the same. For example, the number of processors (CPUs (Central Processing Units)), the memory capacity, and the like may be different in each of the server computers (100, 105, 140).

Among the plurality of server computers (100, 105, 140), the server computer 105 is a computer in which application programs (AP) to be used by a user are executed and is hereinafter referred to as an "AP server 105". The application program is a database management system (DBMS), or a program, such as spreadsheet software and a word processor.

On the other hand, the server computer 100 is a computer operating as a storage apparatus for storing data to be used by the AP server 105. The server computer 100 is a so-called Software Defined Storage (SDS), and the server computer 100 acts as the storage apparatus by the processor in the server computer 100 executing a program (storage control program 130 described later) to cause the server computer 100 to operate as the storage apparatus. Therefore, the server computer 100 is referred to as an "SDS 100".

The SDS 100 can define one or more volumes, and the defined volume is provided to an initiator, such as the AP server 105. The AP server 105 issues a write command to a volume (SDS 100 which provides the volume) to thereby store data (for example, database table and the like) generated by application programs in the volume and issues a read command to a volume (SDS 100 which provides the volume) to thereby read data from the volume.

In this embodiment, an I/O request (command) exchanged between the AP server 105 and the SDS 100 is a command (hereinafter referred to as an "SCSI command") according to the standard of the SCSI standardized by the ANSI T10. However, an I/O request of a type other than the SCSI command may be used.

The server computer 140 is a computer to be used in order for a user or an administrator (hereinafter simply referred to as a "user") of the information system to perform a management operation of the information system and is hereinafter referred to as a "management server 140". The management server 140 has input devices, such as a keyboard and a mouse, and output devices, such as a display, to be used when the user performs the management operation of the information system. It is a matter of course that the server computers (SDS 100, AP server 105) other than the management server 140 may also have the input devices and the output devices.

Two or more of the SDSs 100, the AP servers 105, and the management servers 140 may be present in the information system. However, this embodiment describes an example in which one AP server 105 and one management server 140 are present in the information system and two or more of the SDSs 100 are present in the information system. Moreover, the program (storage control program 130) executed by each SDS 100 may not necessarily be the same program.

For the network 120, a transmission medium, such as Ethernet or Fibre Channel, is used. The network 120 is used when the AP server 105 reads and writes data from/in the SDSs 100 and is also used for exchange of management operation commands (or various management information) between the management server 140 and the SDSs 100 (or AP server 105). However, as another embodiment, two kinds of networks of a network for transmitting and receiving data to be read and written between the AP server 105 and the SDSs 100 and a network in order for the management server 140 to transmit and receive a management operation command and the like may be provided.

Figure 2:
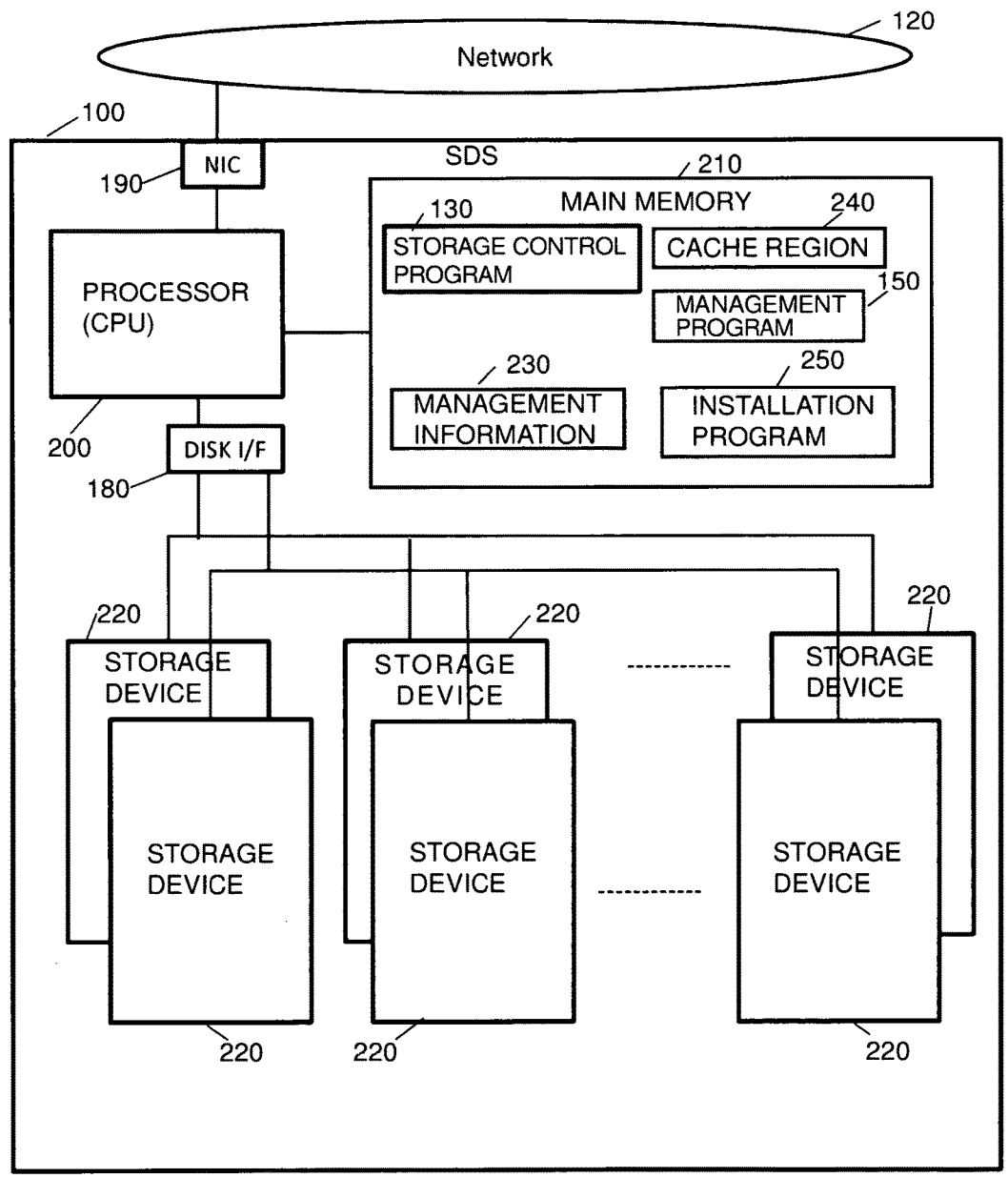
FIG. 2 is a view illustrating the configuration of an SDS in this embodiment.

FIG. 2 illustrates the configuration of the SDS 100. The SDS 100 contains one or more processors (CPU) 200, a main memory 210, storage devices 220, a network interface controller (NIC) 190, and a disk interface (DISK I/F) 180. The number of the processor 200, the storage device 220, the NIC 190, and the DISK I/F 180 may be one, or more than one.

The processor 200 executes each program loaded in the main memory 210. The main memory 210 is a volatile memory, such as a DRAM (Dynamic Random Access Memory). The main memory 210 stores a storage control program 130, a management program 150, an installation program 250, and management information 230 used by the storage control program 130.

On the other hand, the storage device 220 is a storage device having nonvolatile storage media, such as a magnetic disk and a flash memory, and is used for storing data written from the AP server 105. The storage control program 130, the management information 230, and the like described above may be stored in the storage device 220 when the SDS 100 is not working (when a power supply is turned OFF) and may be loaded to the main memory 210 from the storage device 220 when the SDS 100 is started.

The disk interface 180 is an interface device provided between the processor 200 and the storage device 220. On the other hand, the NIC 190 is an interface device for connecting the SDSs 100 to the network 120 and also has a port for connecting a transmission line (network cable) provided between the SDS 100 and the network 120. Therefore, the NIC 190 is sometimes also referred to as a "port 190".

Then, the roles of the programs stored in the main memory 210 are summarized. In the following description, processing to be executed by the server computer (SDS 100, AP server 105, management server 140, and the like) is sometimes described using a "program" as the subject, but in reality, processing described in the program is performed by a processor in the server computer executing the program. However, in order to avoid a redundant description, the contents of the processing are sometimes described using the program as the subject. It means that the subject of the processing described using the program as the subject is actually the processor executing the program.

The storage control program 130 is a program for causing the SDS 100 (i.e., server computer) to function as a storage apparatus. Specifically, the SDS 100 performs processing, such as providing one or more volumes to the initiator, such as the AP server 105, receiving an I/O request (read request and write request) from the initiator and returning data of an address designated by the read request to the initiator, or storing the write data designated by the write request in the volume, by the operation of the storage control program 130. As is well known, the conventional storage apparatus has functions (for example, creating a mirror copy of a volume, and so on) other than a function of providing a volume. The storage control program 130 may similarly also be a program implementing functions other than the function of providing a volume to the SDS 100.

Moreover, the storage control program 130 secures a region for holding data frequently accessed from the AP server 105 on the main memory 210. The region for holding the data frequently accessed from the AP server 105 is referred to as a cache region 240. However, the SDS 100 does not necessarily need to have the cache region 240.

Moreover, the SDS 100 may have a means for preventing loss of the data held in the main memory 210 in a trouble, such as a power failure. For example, the SDS 100 may have a battery, and hold the data on the main memory 210 using the power supplied from the battery in a power failure. However, the SDS 100 does not necessarily need to have a data holding means, such as a battery.

The management program 150 (or storage management program 150) is a program for managing the storage apparatus (SDS) in the information system. Specifically, the management performed by the management program 150 is an operation, such as definition or deletion of a volume, monitoring of the state of the SDS 100, or the like. This embodiment describes an example in which the management program 150 is installed in one specific SDS 100 (SDS#x described later) in the information system. The management program 150 can manage all the SDSs in the information system. Moreover, in the management server 140, a client program (not illustrated) communicating with the management program 150 executed in the SDS 100 is executed. A user directs the definition of a volume or the like to the management server 140 using the client program.

An installation program 250 is a program for installing a program. The installation program 250 is provided in each SDS 100 in the information system. For example, the storage control program 130 is installed in the SDS 100 by the installation program 250. When a user installs a program, the user issues an installation direction to the management program 150 executed by the SDS 100 using the management server 140. The management program 150 receiving the installation direction causes the installation program 250 provided in the SDS 100 at the program installation destination to install the program.

In the SDS 100, programs other than the programs described above may also be executed. For example, in the SDS 100 (processor 200), an operating system to be executed by a general purpose computer may be executed. In that case, the storage control program 130 and the like operate while using a function provided by the operating system. Or, a program (for example, referred to as a hypervisor) for defining a so-called virtual computer may be executed on the SDS 100. In that case, the storage control program 130 and the like may be executed on the defined virtual computer.

In the information system according to this embodiment, two or more of the SDSs 100 coexist. The storage control program 130 executed in each SDS 100 may not necessarily be a program of the same type. When two or more kinds of the storage control programs 130 are executed in the information system, each storage control program 130, at least, needs to be a program which is executable by a general purpose computer (server computer in this embodiment or the like), and needs to be a program which can cause the SDS 100 to provide the minimum function as the storage apparatus, but functions to be supported by each storage control program 130 may have a difference. The minimum function as the storage apparatus is a function of providing one or more volumes to an initiator and reading and writing data according to a read command and a write command from the initiator.

Figure 3:
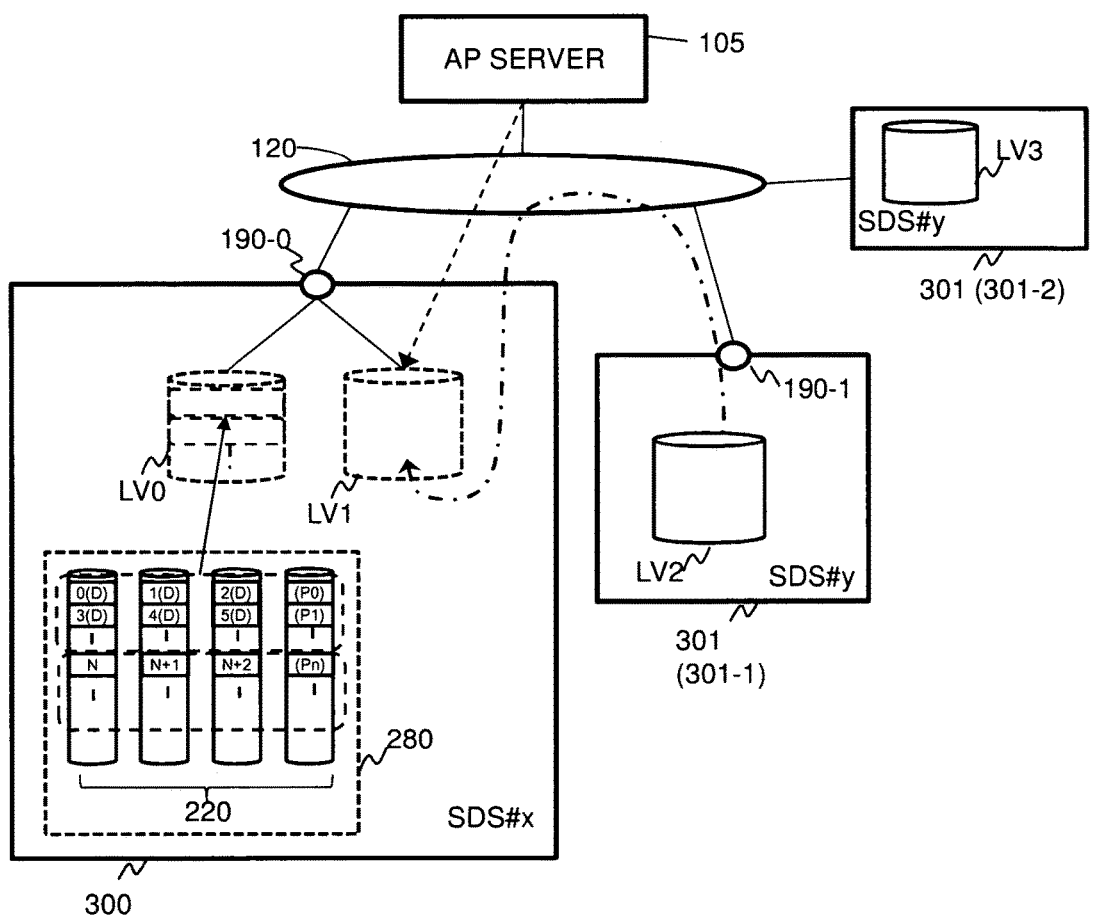
FIG. 3 is a view for explaining the concept of a virtualization function.

This embodiment is based on the premise that one SDS 100 having a volume virtualization function as illustrated in FIG. 3 (hereinafter referred to as "SDS#x (300)") is present and one or more SDSs 100 capable of providing fewer functions than that of the SDS#x (300) (hereinafter referred to as "SDS#y (301)") are present in the information system. For example, the SDS#y (301) does not have the virtualization function that the SDS#x (300) has. Or, as another example, while the SDS#x (300) has a function (remote mirroring function) of creating a replica (mirror) of a volume in a storage apparatus at a remote place and a function of compressing data for storing, the SDS#y (301) does not have the functions.

Although the number of the SDS#x (300) and the number of the SDS#y (301) present in the information system may be one or more than one, respectively, this embodiment describes an example in which one SDS#x (300) and a plurality of the SDS#y's (301) are present in the information system, unless otherwise particularly specified. When a plurality of the SDS#y's (301) are present, each of the SDS#y's (301) provides the minimum function as the storage apparatus but the types of other functions to be supported by each of them may be different.

In the information system according to this embodiment, the SDS#x (300) provides a volume owed by another SDS#y (301) as its own (SDS#x (300)) volume to the AP server 105 by the virtualization function. The following description describes functions mainly performed by the SDS#x (300). Then, in order to avoid confusion between a volume provided to the AP server 105 by the SDS#x (300) and volumes owned by the other SDSs (SDS#y (301)), the volume provided to the AP server 105 by the SDS#x (300) is referred to as a "logical volume". This embodiment is based on the premise that the AP server 105 is configured so as to issue an I/O request (read command or write command) to the logical volume provided by the SDS#x (300) and is configured so as not to directly issue an I/O request to the other SDSs 100 (SDS#y (301)).

Then, a management method of a storage region in the SDS#x according to this embodiment is described. The SDS#x (300) does not directly provide the storage space of the storage device 220 to the initiators (AP server 105 and the like) and defines the logical volume which is a storage space different from the storage space of the storage device 220. The SDS#x (300) can define a plurality of logical volumes. A unique identification number is given to each logical volume in the SDS#x (300) and is referred to as a logical volume identifier (or logical volume ID).

The SDS#x can provide a logical volume defined by the Thin Provisioning function to the AP server 105. Simultaneously, the SDS#x has a volume virtualization function to thereby be able to define a logical volume using the storage region owned by another storage apparatus.

The outline of the virtualization function is described with reference to FIG. 3. In FIG. 3, the SDS#x (300) is an apparatus having the virtualization function, in which both LV0 and LV1 represent logical volumes which the SDS#x (300) provides to the AP server 105 (or another device). The LV0 is the logical volume defined by the Thin Provisioning function. The logical volume LV0 is formed using the storage region (real page) of the storage device 220 in the SDS#x (300).

On the other hand, the LV1 is a logical volume defined by the virtualization function and the LV1 is configured so as to use a volume provided by another storage apparatus (for example, SDS#y (301)) as the storage region. FIG. 3 is a conceptual diagram illustrating a state where the logical volume LV1 is configured so as to use a volume (LV2) provided by the SDS#y (301) as the storage region. Hereinafter, this state is expressed as "The LV2 is mapped to the LV1." or "The LV2 is allocated to the LV1."

When the AP server 105 issues an I/O request (for example, read command) to the logical volume LV1 to which the volume LV2 is mapped, the SDS#x (300) converts the I/O request into an I/O request to the volume (volume LV2) which is mapped to the logical volume LV1. Furthermore, the SDS#x (300) issues the converted I/O request to the SDS#y (301) through the network 120 (i.e., herein the SDS#x (300) operates as a target device to the AP server 105 and operates as an initiator to the SDS#y (301)).

Figure 4:
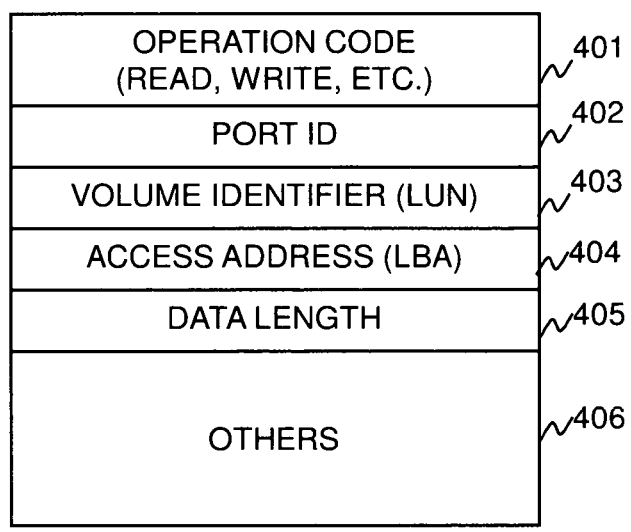
FIG. 4 is a view illustrating an example of a format of an I/O request in this embodiment.

FIG. 4 illustrates an example of the format of the I/O request (read command or write command) issued from the initiator (AP server 105 and the like) to the SDS 100 in this embodiment. An I/O request 400 contains at least an operation code 401, a port ID 402, a volume identifier 403, an access address 404, and a data length 405.

The operation code 401 stores the type of the I/O request. For example, when the AP server 105 issues a read command, information indicating that the command is a read command is stored in the operation code 401.

The port ID 402 is an identifier of the port 190 of the SDS 100 having a volume to be accessed. For the identifier of the port 190, an iSCSI Name (in the case of a network where the network 120 transmits a TCP/IP protocol), a PORT ID (in the case of a network where the network 120 is composed of fiber channels), or the like is used.

The volume identifier 403 is an identifier of the volume to be accessed, and a LUN (Logical Unit Number) or the like is used, for example. The access address 404 and the data length 405 are information indicating the access range in the volume to be accessed. When "A" is contained in the access address 404 and "B" is contained in the data length 405, a region of the size B starting with the address A is the range to be accessed. The unit of the information stored in the access address 404 or the data length 405 is not limited to a specific one. For example, the number of blocks (1 block is a region of 512 bytes.) may be stored in the data length 405 and an LBA (Logical Block Address) may be stored in the access address 404.

Moreover, the I/O request 400 may contain information (which is indicated as "others 406" in FIG. 4) other than the information described above. For example, when the I/O request is a write command, data to be written is added after the data length 405.

When the AP server 105 issues an I/O request to the LV1, an identifier of a port 190-0 of the SDS#x (300) is contained in the port ID 402 and an identifier (LUN or the like) of the LV1 is contained in the volume identifier 403. When receiving the I/O request, the SDS#x (300) changes the port ID 402 to the identifier of the port 190-1 of the SDS#y (301) and changes the volume identifier 403 to the volume identifier of the LV2 to thereby convert the I/O request. Then, the converted I/O request is transmitted to the SDS#y (301) through the network 120.

This embodiment is based on the premise that the size of the LV1 is the same as the size of the volume (LV2 in the example of FIG. 3) mapped to the LV1, unless otherwise particularly specified. Moreover, this embodiment is based on the premise that each address on the LV1 is mapped to the same address of the LV2. Therefore, when converting an I/O request to the LV1 issued from the AP server 105, the SDS#x (300) does not change the access address 404 and the data length 405.

However, as another embodiment, a configuration may be acceptable in which a plurality of volumes is mapped to the LV1. For example, in FIG. 3, the LV1 may be configured so that the LV2 is mapped to the first half of the storage space of the LV1 and a volume LV3 of an SDS#y (301-2) is mapped to the second half of the storage space of LV1. When the LV1 is configured as described above, the SDS#x (300) changes the access address 404 when converting the I/O request to the LV1 in some cases.

Furthermore, as another embodiment, a configuration may be acceptable in which a storage space of the storage device 220 in the SDS#x (300) is mapped to a part of the storage space of the LV1.

Then, the Thin Provisioning function and a method for managing the storage region within the SDS#x (300) are described.

A logical volume formed by the Thin Provisioning function is configured so as to use the storage device 220 of itself (i.e., SDS#x (300)) as the storage region. However, a storage region to be used for storing data written to each address on the logical volume is not determined at first (immediately after the logical volume is defined). When receiving a write request to the logical volume from the initiator, such as the AP server 105, the SDS#x (300) determines the storage region in the storage device 220 serving as the storage destination of the data written in the write range (range designated by the write request) for the first time. Hereinafter, the processing of determining the storage destination of the data to be written in the write range (range designated by the write request) is expressed as "allocating".

The storage region allocated to the logical volume by the Thin Provisioning function is described. The SDS#x (300) has a Redundant Arrays of Inexpensive/Independent Disks/Device (RAID) function capable of recovering data in the storage device 220 even when any one of the plurality of storage devices 220 breaks down. The SDS#x (300) configures one RAID containing some (4 or 8, for example) storage devices 220 in the SDS#x (300). A group of the storage devices 220 configuring the RAID is referred to as a storage device group 280. In the SDS#x (300) according to this embodiment, one storage device group 280 is composed of the storage devices 220 of the same type. The SDS#x (300) manages each storage region of the storage device group 280 as a storage space which can be specified by one-dimensional address.

The relationship between the logical volume formed by the Thin Provisioning function and the storage device group 280 is described with reference to FIG. 5. For the management of a storage region to be allocated to the logical volume ("LV0" in the figure), the SDS#x (300) manages the logical volume in each region having a predetermined size referred to as a virtual page (VP0, VP1, or VP2 in FIG. 5). When the storage regions are allocated to the logical volume, the SDS#x (300) allocates the storage region to each virtual page. To each virtual page, an identification number that is unique within the logical volume is given. The identification number is referred to as a virtual page number (or sometimes indicated as "virtual page #"). A virtual page having a virtual page number n is indicated as "Virtual page #n".

The virtual page is a concept to be used only for the management of the storage space of the logical volume inside the SDS#x (300). When accessing the storage region of the logical volume, the initiator, such as the AP server 105, specifies the storage region to be accessed using an address, such as LBA (Logical Block Address). When the AP server 105 issues an access request to the logical volume, the SDS#x (300) converts the LBA designated by the AP server 105 to the virtual page number and a relative address (offset address from the top of the virtual page) in the virtual page. This conversion can be realized by dividing the LBA by the virtual page size. When the size of the virtual page is P (MB), a region corresponding to the P (MB) from the top position of the logical volume is managed as a virtual page #0 and the next region corresponding to the P (MB) is managed as a virtual page #1. The following regions corresponding to the P (MB) are similarly managed as virtual pages #2, #3, . . . .

Immediately after the SDS#x (300) defines the logical volume, a physical storage region is not allocated to each virtual page. When the SDS#x (300) receives a write request to a virtual page from the AP server 105, it allocates the physical storage region to the virtual page for the first time. The physical storage region to be allocated to the virtual page is referred to as a real page. The real page is a storage region on the storage device group 280. FIG. 5 illustrates a state where a real page RP0 is allocated to the virtual page #0 (VP0).

The real page is a region formed using the storage regions of the plurality of storage devices 220 of the storage device group 280. In FIG. 5, 160-1, 160-2, 160-3, 160-4 each represent the storage region of each storage device 220. Moreover, the RAID level (type of data redundancy scheme in the RAID technique, The RAID level generally includes types of RAID level 1 (RAID 1) to RAID level 6 (RAID 6).) of the storage device group 280 illustrated in FIG. 5 is RAID4, which is the RAID composed of three data drives and one parity drive. However, the RAID levels (for example, RAID5 and RAID6) other than the RAID4 may be used for the RAID level of the storage device group 280.

The SDS#x (300) divides the storage region of each storage device 220 belonging to the storage device group 280 into a plurality of storage regions of a fixed size referred to as a stripe block, and then manages the same. For example, in FIG. 5, each region designated by 0 (D), 1 (D), 2 (D), . . . or P0, P1, . . . represent the stripe block.

Figure 5:
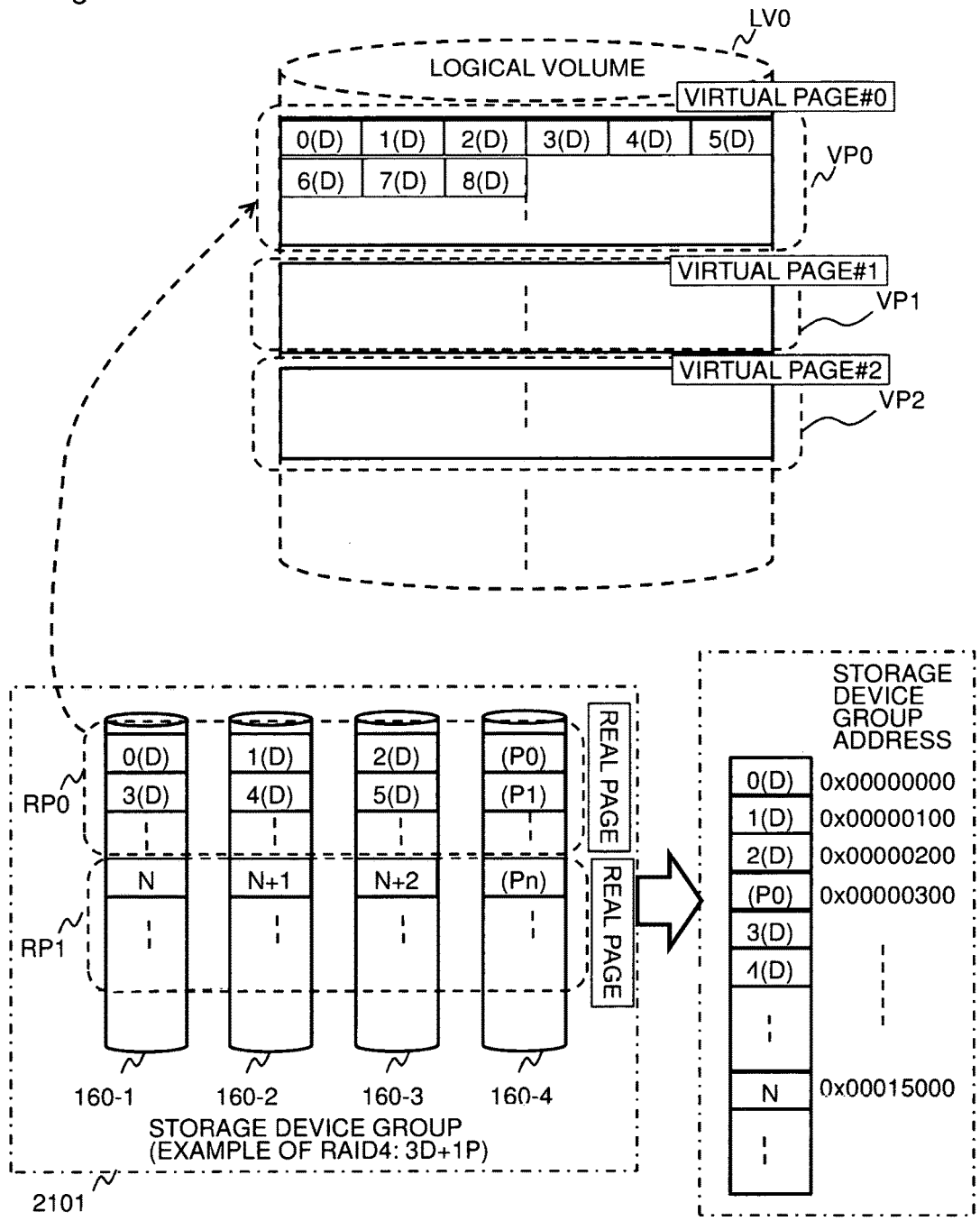
FIG. 5 is a view for explaining the concept of a Thin Provisioning function in this embodiment.

In FIG. 5, the stripe blocks designated by P0, P1, . . . among the stripe blocks are stripe blocks storing redundant data (parity) generated by the RAID function and are referred to as "parity stripes". On the other hand, the stripe blocks designated by 0 (D), 1 (D), 2 (D), . . . are stripe blocks storing data (not redundant data) to be written from the AP server 105. The stripe blocks are referred to as "data stripes". The parity stripe stores redundant data generated using the plurality of data stripes.

Hereinafter, a set of a parity stripe and data stripes to be used in order to generate redundant data to be stored in this parity stripe is referred to as a "stripe line". The example illustrated in FIG. 5 has a relationship that redundant data (parity) generated using the data stripes 0 (D), 1 (D), and 2 (D) is stored in the parity stripe P0, for example, and the data stripes 0 (D), 1 (D), 2 (D) and the parity stripe P0 belong to the same stripe line.

More specifically, each stripe block belonging to one stripe line is present at the same location (address) on the storage apparatus (160-1, 160-2, 160-3, 160-4). However, as another embodiment, a configuration may be used in which each stripe block belonging to the same stripe line is present at different addresses on the storage devices 220. The real pages (for example, RP0, RP1) are regions composed of one or two or more of stripe lines as illustrated in FIG. 5.

The SDS#x (300) manages each storage region (block) of the storage device group 280 as a storage space which can be specified by a one-dimensional address. Hereinafter, the storage space is referred to as a "storage space of the storage device group" and the address on the storage space is referred to as an "address of the storage device group", or a "storage device group address". FIG. 5 illustrates an example of the storage device group address. The storage space of the storage device group is a storage space in which one stripe in the storage device group 280 as Illustrated in FIG. 5 is disposed one by one. The storage device group address of the top stripe block in the storage device group is determined as 0, and then addresses are given to the following stripe blocks as illustrated in FIG. 5, for example. The storage device group address is used in order to manage the correspondence relationship between the real page and the storage region on the storage device group 280.

When the real page is allocated to the virtual page, only the data stripes (0 (D), 1 (D), and the like) are allocated and no parity stripes are allocated. Therefore, a relationship is established in which the total size of the region where the write data is to be stored on the real page is equal to the size of the virtual page. More specifically, a relationship of (Size of real page−Size of parity storing region)=Virtual page size is established. Although FIG. 5 illustrates only the configuration example of the RAID4, when the RAID type of the storage device group 280 is RAID1, for example, the real page size is twice the virtual page size.

The SDS#x (300) does not need to support the RAID function. In that case, the parity stripe is not defined and the size of the real page and the size of the virtual page are the same.

The relationship (mapping) between each region in the virtual page and each region in the real page is as illustrated in FIG. 5. More specifically, the regions (0 (D), 1 (D), 2 (D)) excluding the parity from the top stripe of the real page are allocated to the top region of the virtual page. The same applies to the following regions, and the regions (3 (D), 4 (D), 5 (D), . . . ) excluding the parity from each stripe on and after the second stripe of the real page are similarly allocated to regions of the virtual page.

Thus, each region in the virtual page and each region in the real page is regularly mapped. Therefore, the SDS#x determines the virtual page number and a relative address (offset address from the top of the virtual page) in the virtual page from the access location (LBA) on the logical volume designated by an access request from the AP server 105, whereby the storage device 220 and a region (data stripe) in the storage device 220 assigned to the access location can be uniquely calculated. Furthermore, in addition to the data stripe assigned to the access location, a parity stripe belonging to the same stripe line as that of the data stripe is also uniquely determined. However, the mapping between each region in the virtual page and each region in the real page is not limited to the mapping method described herein.

The real page allocated to each virtual page in one logical volume is not necessarily limited to the real page in the same storage device group 280. The real page allocated to the virtual page #0 and the real page allocated to the virtual page #1 may be real pages in different storage device groups 280.

The real page to be allocated to the virtual page need to be a real page not allocated to another virtual page. The real page not allocated to the virtual page is referred to as a "free page" or a "free real page".

Herein, the Thin Provisioning function and the virtualization function of the SDS#x (300) are described, but the other storage apparatus (SDS#y (301) and the like) in the information system according to this embodiment does not need to have these functions. For example, the SDS#y (301) may be configured so as to provide, as a volume, the storage space of the storage device 220 provided in itself (SDS#y (301)) as it is to the initiator, such as the AP server 105.

In this embodiment, when the AP server 105 uses the volume owned by the SDS#y (301), the AP server 105 uses the volume using the virtualization function of SDS#x (300) in principle. More specifically, when a user wants to use the volume owned by the SDS#y (301), the user defines a logical volume in the SDS#x (300), and then maps the volume in SDS#y (301) to the logical volume in the SDS#x (300). Then, the user (AP server 105) accesses the logical volume defined in the SDS#x (300) to thereby use the volume in the SDS#y (301).

Figure 6:
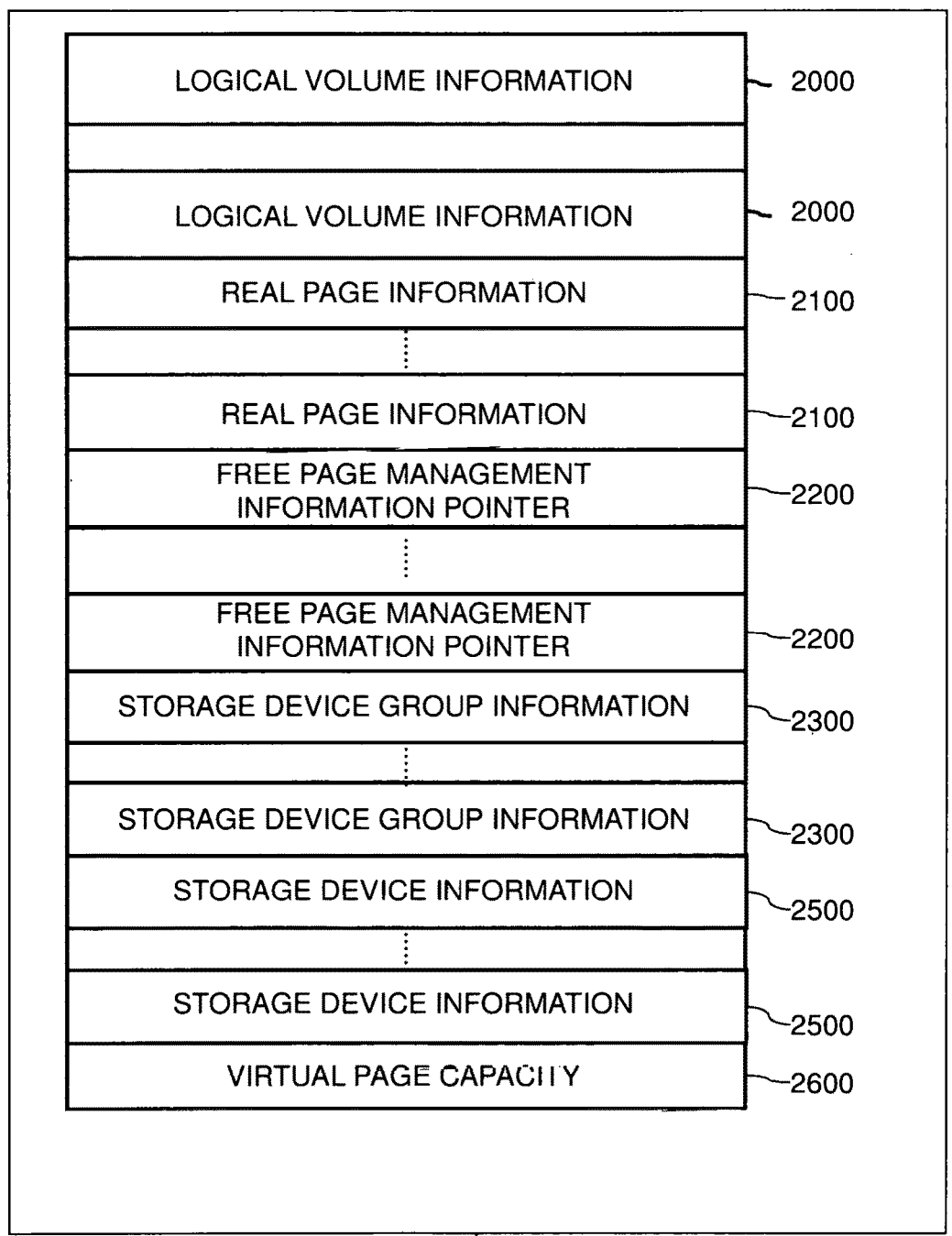
FIG. 6 is a view illustrating information contained in management information.

Then, the contents of the management information to be used by the storage control program 130 of the SDS#x (301) in this embodiment are described. FIG. 6 illustrates major information contained in the management information 230 of the SDS#x (301). The management information 230 contains logical volume information 2000, real page information 2100, free page management information pointer 2200, storage device group information 2300, storage device information 2500, and a virtual page capacity 2600. However, the management information 230 may contain information other than the information mentioned above.

The logical volume information 2000 is management information, such as the configuration (for example, mapping between the virtual page and the real page) of the logical volume. The logical volume information 2000 is defined in each logical volume in the SDS#x (300). Therefore, when L logical volumes are defined in the SDS#x (300), L pieces of the logical volume information 2000 are present in the management information 230. Hereinafter, the logical volume, the attribute information of which is managed by a certain logical volume information 2000, is referred to as a "logical volume to be managed".

The real page information 2100 is information for managing the real page and the real page information 2100 is present in each real page (In the management information 230, the real page information 2100 of the same number as the number of the real pages of the SDS#x (300) is present.). Hereinafter, the real page, the attribute information of which is managed by a certain real page information 2100, is referred to as the "real page to be managed".

The storage device group information 2300 is information on the configuration of the storage device group 280 in the SDS#x (300). The storage device group information 2300 is present in each storage device group 280. Hereinafter, the storage device group, the attribute information of which is managed by a certain storage device group information 2300, is referred to as a "storage device group to be managed".

The storage device information 2500 is information on the storage device 220 in the SDS#x (300) and is present in each storage device 220. Hereinafter, the storage device, the attribute information of which is managed by a certain storage device information 2500, is referred to as a "storage device to be managed".

The free page management information pointer 2200 is information for managing the free real page, and one free page management information pointer 2200 is present per storage device group 280.

The virtual page capacity 2600 is information indicating the size of the virtual page. This embodiment is based on the premise that all the sizes of the virtual pages in the logical volumes are equal. Therefore, only one virtual page capacity 2600 is present in the management information 230.

Figure 7:
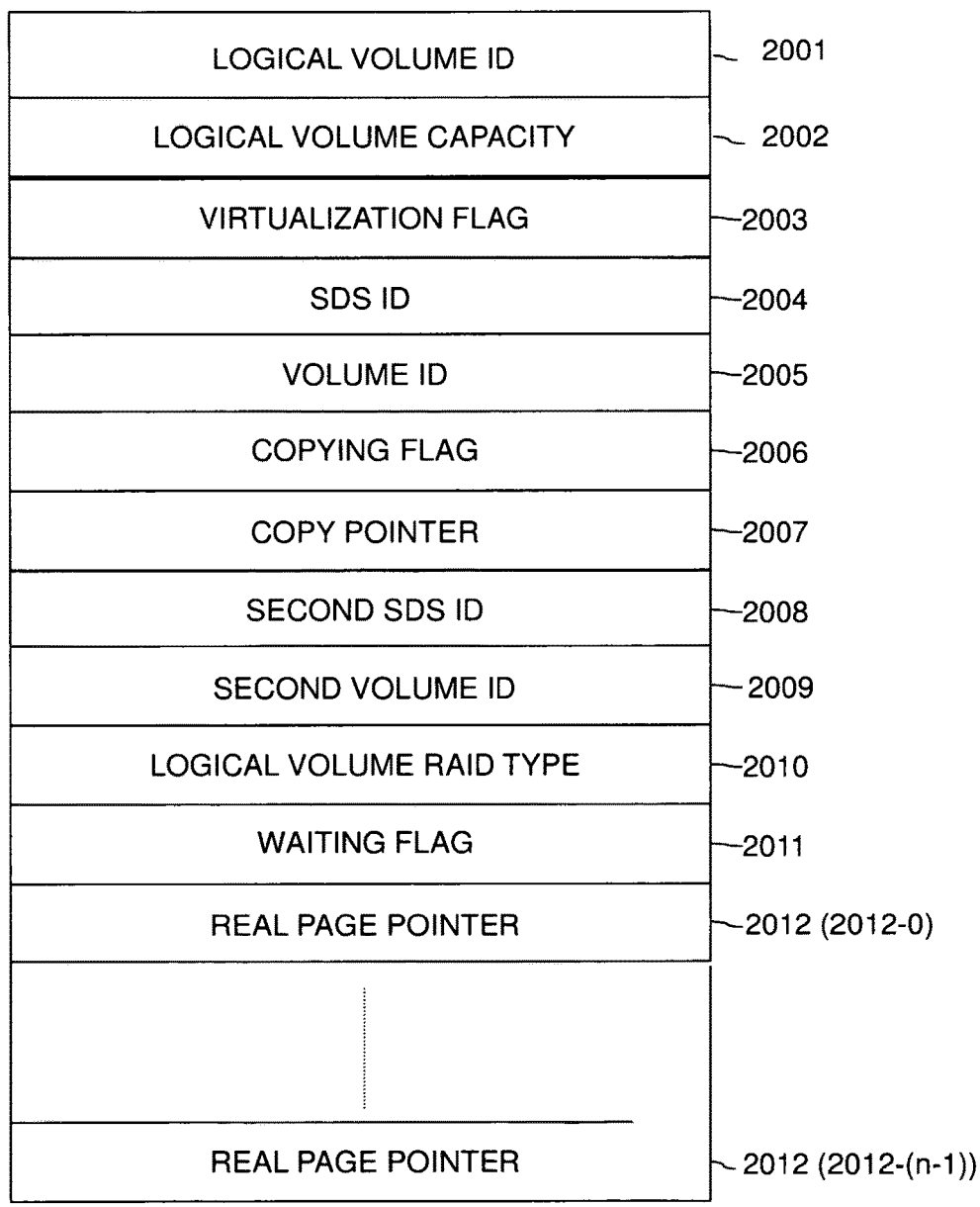
FIG. 7 is a view illustrating the format of logical volume information.

FIG. 7 illustrates the format of the logical volume information 2000. The logical volume information 2000 contains a logical volume ID 2001, a logical volume capacity 2002, a virtualization flag 2003, an SDS ID 2004, a volume ID 2005, a copying flag 2006, a copy pointer 2007, a second SDS ID 2008, a second volume ID 2009, a logical volume RAID type 2010, a waiting flag 2011, and real page pointers 2012.

The logical volume ID 2001 indicates an identifier of the logical volume to be managed. This embodiment describes an example in which a LUN (Logical Unit Number) is used for the identifier of the logical volume. However, the identifier of the logical volume should be a unique identifier in the SDS 100, and identifiers other than the LUN may be used. In this embodiment, the identifier is sometimes indicated as "ID".

The logical volume capacity 2002 is the capacity of the logical volume to be managed.

The virtualization flag 2003 stores either 0 (OFF) or 1 (ON). When the logical volume to be managed is formed using a volume of another storage apparatus (SDS 100 other than the SDS#x (300)) (i.e., in the case of the logical volume defined using the virtualization function), the virtualization flag 2003 is set to ON (1). When the virtualization flag 2003 of the logical volume information 2000 is ON, the SDS ID 2004 and the volume ID 2005 represent the identifier of the SDS 100 having a volume mapped to the logical volume to be managed and the identifier of the volume, respectively. This embodiment is based on the premise that the identifier of the port 190 of the SDS 100 is used as the identifier of the SDS 100. Therefore, the identifier of the port 190 of the SDS 100 is stored in the SDS ID 2004 and the second SDS ID 2008 described later. However, information other than the information above may be used as the identifier of the SDS 100.

The copying flag 2006 and the second SDS ID 2008 are used when the logical volume is a logical volume defined using the virtualization function. The SDS#x (300) sometimes performs copy processing of the logical volume which is defined using the virtualization function by executing a copy processing execution portion 4300 described later. In the copy processing, data in the volume mapped to the logical volume is copied to another place (storage device 220 in the SDS#x (300), or another SDS 100). The copying flag 2006 is information indicating whether the data in a volume mapped to the logical volume is being copied to another place. When the copying flag 2006 is "ON (1)", it is indicated that copy processing is being performed. The copy pointer 2007 is information to be used in the copy processing and is described in detail later.

The second SDS ID 2008 represents an identifier of an SDS 100 at a copy destination of the data of the volume mapped to the logical volume. The SDS 100 at the copy destination may be a self-apparatus (i.e., SDS#x (300)). When the second SDS ID 2008 is the identifier of the SDS#x (300), it means that the copy processing execution portion 4300 is copying the data of the volume mapped to the logical volume onto the storage device 220 of the SDS#x. To the contrary, when the second SDS ID 2008 is not the identifier of an SDS#x, it means that the copy destination of the data of the volume mapped to the logical volume is a volume in another SDS 100. When the copy destination of data is the volume in another SDS 100, the second volume ID 2009 represents the identifier of a volume at the data copy destination.

The logical volume RAID type 2010 stores information on the RAID configuration of the storage device group 280 having the real page to be allocated to the logical volume. In this embodiment, the RAID configuration is specifically information containing the RAID level of the RAID (storage device group 280) and the number of the storage devices 220 configuring the storage device group 280.

The waiting flag 2011 is information indicating that the logical volume to be managed has read/write processing in a waiting state.

The real page pointer 2012 is information on the correspondence (mapping) between the virtual page in the logical volume to be managed and the real page. The real page pointer 2012 stores a pointer (address on the main memory 210) to page management information (real page information 2100 described later) of a real page allocated to a virtual page.

The number of the real page pointers 2012 contained in one logical volume information 2000 is the number of the virtual pages in the logical volume to be managed (equal to the number obtained by dividing the logical volume capacity 2002 by the virtual page capacity 2600). For example, when the number of the virtual pages in the logical volume is n, n real page pointers 2012 are present in the logical volume information 2000 of the logical volume. In FIG. 7, the real page pointer 2012 of a virtual page #p (p is an integer of 0 or more) is indicated as a "real page pointer 2012-$p$".

The opportunity when a real page is allocated to a virtual page is not the time when a logical volume is defined but the time when data writing from the AP server 105 is performed to the virtual page. Therefore, the real page pointer 2012 of a virtual page which has not been written is NULL (Invalid value, for example, a value, such as "−1").

Figure 8:
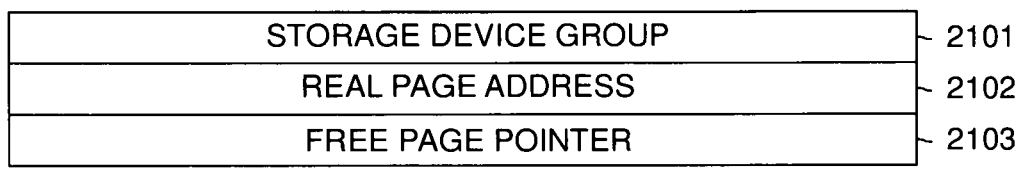
FIG. 8 is a view illustrating the format of real page information.

FIG. 8 illustrates the format of the real page information 2100. As described above, the real page is a storage region defined in the storage device group 280. The real page information 2100 is information storing information specifying the storage device group 280 in which the real page is present and the location in the storage device group 280 and specifically contains a storage device group 2101, a real page address 2102, and a free page pointer 2103.

The storage device group 2101 represents an identifier (referred to as storage device group ID) of the storage device group 280 to which the real page to be managed belongs. The real page address 2102 is information indicating the location where the real page to be managed is present. Since the real page is present in the storage device group 280, the information to be used for the real page address 2102 is an address of the storage device group 280. Specifically, the real page address 2102 stores an address of a head region of the real page to be managed. A description is given with reference to FIG. 5. In FIG. 5, a stripe block N is positioned at the head of a real page RP1 and an address (storage group address) of the stripe block N is "0x00015000" ("0x" represents that the numerical value is indicated in hexadecimal), for example, and therefore "0x00015000" is stored in a real page address 2102 of the real page information 2100 of the real page RP1.

The free page pointer 2103 is used when the real page to be managed is not allocated to a virtual page. Details thereof are described later. When a real page is allocated to a virtual page, NULL is stored in the free page pointer 2103 of the real page.

Figure 9:
FIG. 9 is a view illustrating the format of storage device information.

FIG. 9 illustrates the format of the storage device information 2500. The storage device information 2500 is information recording attribute information of the storage device 220, and contains information of a storage device ID 2501 and a storage capacity 2502. The storage device ID 2501 is an identifier of the storage device to be managed. The storage capacity 2502 is the capacity of the storage device to be managed.

Figure 10:
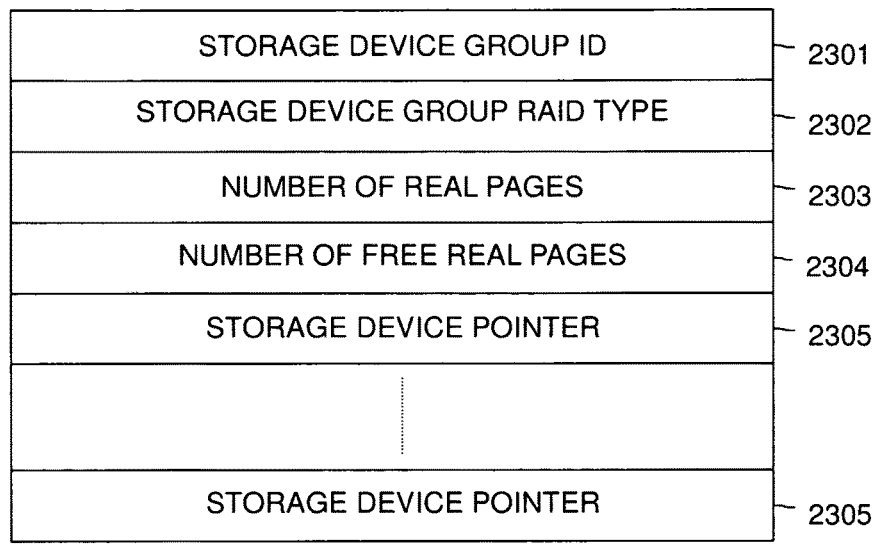
FIG. 10 is a view illustrating the format of storage device group information.

FIG. 10 illustrates the format of the storage device group information 2300. The storage device group information 2300 has information of a storage device group ID 2301, a storage device group RAID type 2302, a number of real pages 2303, a number of free real pages 2304, and storage device pointers 2305. The storage device pointer 2305 is a pointer to the management information (storage device information 2500) of the storage device 220 belonging to the storage device group to be managed. When the storage device group 280 is composed of N storage devices 220, the storage device group information 2300 of the storage device group 280 has N storage device pointers 2305.

The storage device group ID 2301 is an identifier of the storage device group to be managed. The storage device group RAID type 2302 is the RAID type of the storage device group to be managed. The contents of the information stored in the storage device group RAID type 2302 are the same as those mentioned when the logical volume RAID type 2010 is described. The number of real pages 2303 and the number of free real pages 2304 represent the total number of real pages and the number of free real pages, respectively, of the storage device group to be managed.

Figure 11:
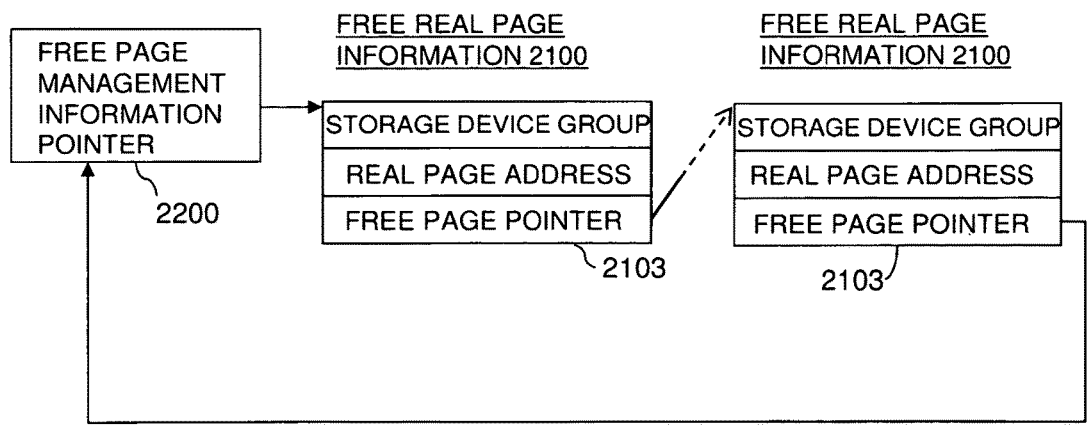
FIG. 11 is a view illustrating the structure of a free page management information queue.

Then, the free page management information pointer 2200 is described. The free page management information pointer 2200 is information provided in each storage device group 280. FIG. 11 illustrates a group of free real pages to be managed by the free page management information pointer 2200. This structure is referred to as a free page management information queue 2201. Among the real page information 2100, the real page information 2100 corresponding to a free real page is referred to as the free real page information 2100. The free page management information pointer 2200 points an address of the top free real page information 2100. Next, the free page pointer 2103 of the top real page information 2100 points the following free real page information 2100. In FIG. 11, the free page pointer 2103 of the last free real page information 2100 points the free page management information pointer 2200 but NULL may be acceptable.

When receiving a write request to a virtual page to which no real page is allocated of the region on the virtual volume, the SDS#x (300) selects any one of the storage device groups 280 among the storage device groups 280 having the same RAID configuration as that of the logical volume RAID type 2010 of the virtual volume. When a plurality of selectable storage device groups 280 exist, the SDS#x (300) selects the storage device group 280 having the largest number of free real pages, searches for a free real page from the free page management information queue 2201 of the storage device group 280, and then allocates the same to the virtual page.

Figure 12:
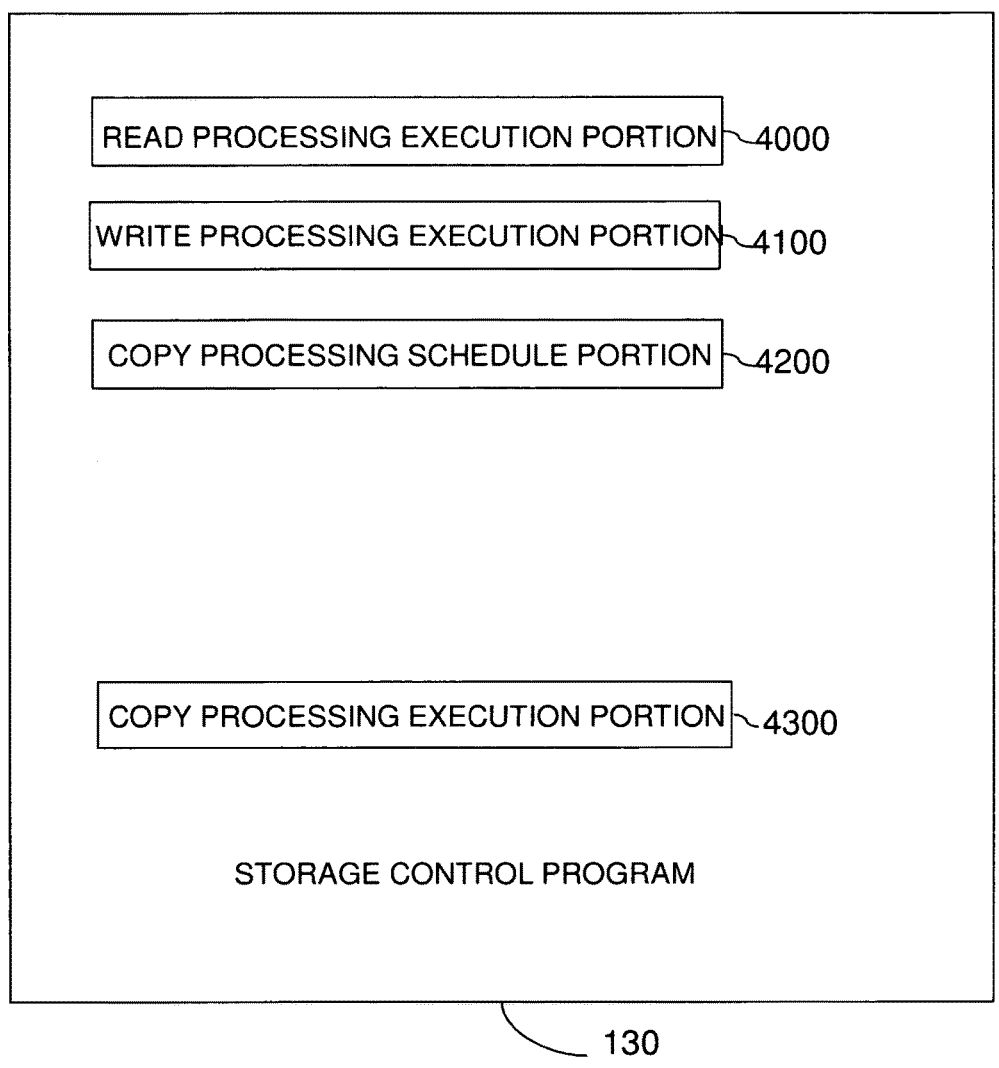
FIG. 12 is a view illustrating a program module contained in a storage control program.

Next, an operation to be executed by the SDS#x (300) using the management information described above is described. The operation of the SDS#x (300) is realized by the processor 200 in the SDS#x (300) executing the storage control program 130 stored in the main memory 210. The storage control program 130 contains a plurality of program modules (hereinafter, referred to as a "module"). FIG. 12 illustrates each module relating to the description of this embodiment among modules of the storage control program 130. The modules relating to this embodiment include a read processing execution portion 4000, a write processing execution portion 4100, a copy processing schedule portion 4200, and the copy processing execution portion 4300.

Figure 13:
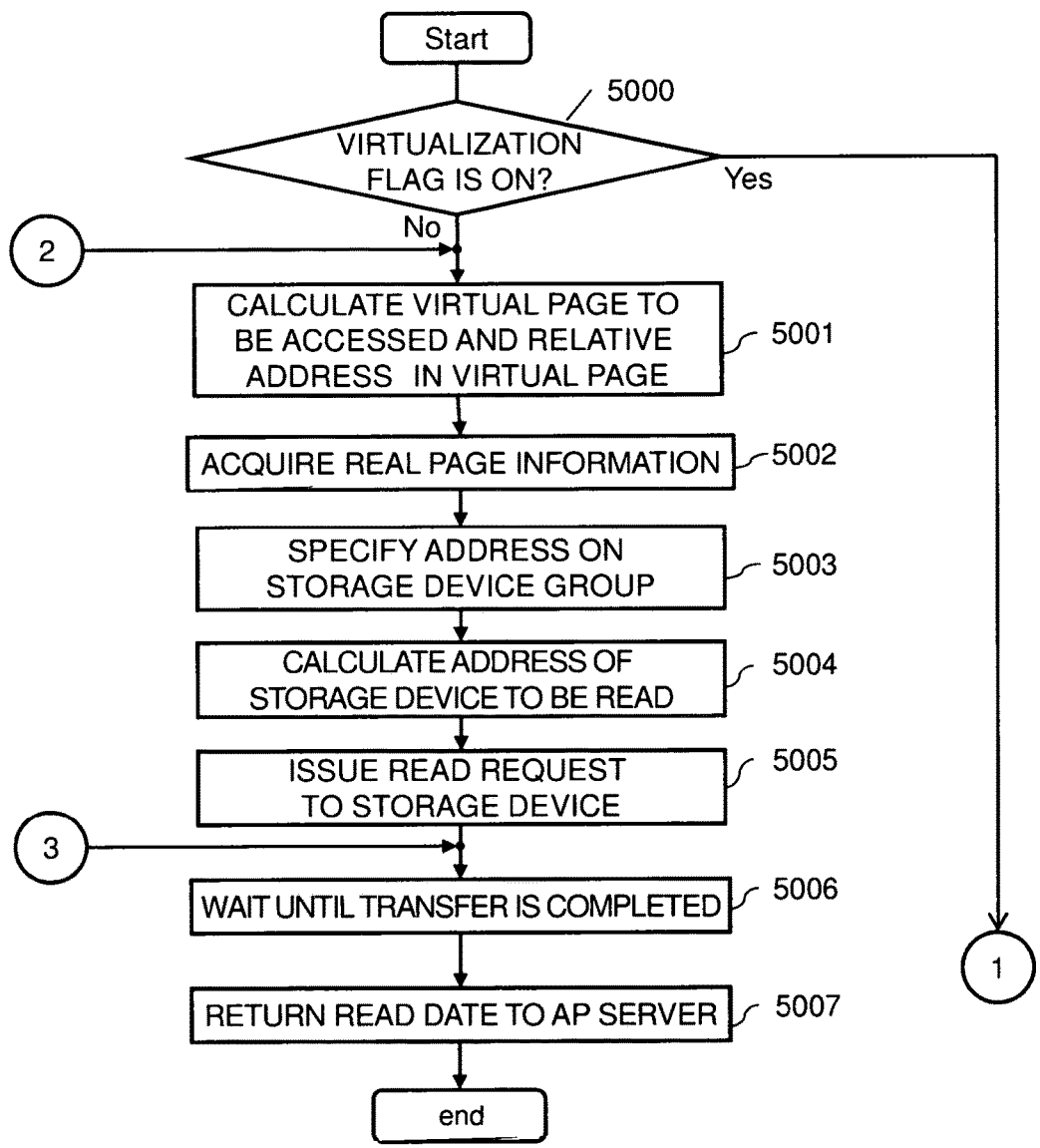
FIG. 13 is a view illustrating a processing flow (1) of a read processing execution portion.
Figure 14:
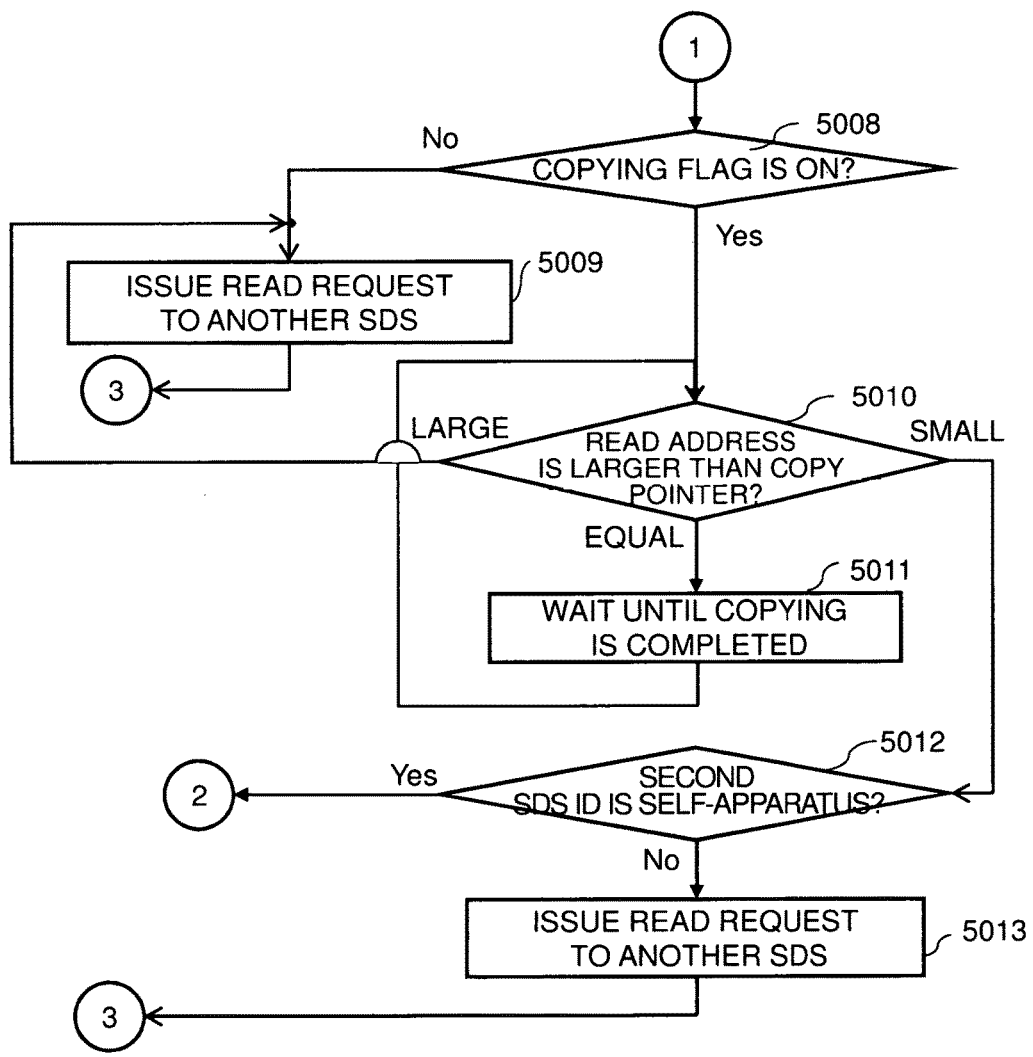
FIG. 14 is a view illustrating a processing flow (2) of the read processing execution portion.

FIG. 13 and FIG. 14 illustrate processing flows of the read processing execution portion 4000. The read processing execution portion 4000 is executed when the SDS#x (300) receives a read request from the AP server 105. In order to avoid complexity of the description, this embodiment describes an example in which a region to be read designated by a read request received from the AP server 105 is within one virtual page.

Step 5000: The read processing execution portion 4000 checks whether the virtualization flag 2003 is ON with reference to the logical volume information 2000 of the logical volume to be read designated by the read request. If the virtualization flag 2003 is ON, Step 5008 (FIG. 14) is performed next. If the virtualization flag 2003 is OFF, the read processing execution portion 4000 executes Step 5001 next.

Step 5001: The read processing execution portion 4000 calculates, from an address to be read designated by the received read request, a virtual page # of a virtual page containing the address to be read and a relative address in the virtual page.

Step 5002: In this step, the read processing execution portion 4000 acquires the real page information 2100 corresponding to the real page allocated to the virtual page serving as the read target from the real page pointer 2012 of the logical volume information 2000.

Step 5003: The read processing execution portion 4000 specifies the storage device group 280 and the address of the storage device group 280 in which the real page to be read is present. The storage device group 280 and the address thereof are obtained by referring to the storage device group 2101 and the real page address 2102 of the real page information 2100 acquired in Step 5002.

Step 5004: The read processing execution portion 4000 calculates a relative address in the real page serving as the access target of the request by using the relative address in the virtual page obtained in Step 5001 and the storage device group RAID type 2302. Then, the read processing execution portion 4000 specifies the storage device 220 to be read and specifies the read destination address of the storage device 220 by using the calculated relative address in the real page, the storage device group RAID type 2302, and the storage device pointer 2305.

Step 5005: The read processing execution portion 4000 issues a read request to the storage device 220 specified in Step 5004.

Step 5006: The read processing execution portion 4000 waits until data is returned from the storage device 220.

Step 5007: The read processing execution portion 4000 sends the data received from the storage device 220 to the AP server 105 to complete the processing.

Step 5008: The read processing execution portion 4000 checks whether the copying flag 2006 is ON. If the copying flag 2006 is ON, Step 5010 is executed next.

Step 5009: If the copying flag 2006 is OFF, the read processing execution portion 4000 issues a read request to the volume in the SDS 100 specified by the SDS ID 2004 and the volume ID 2005 through the network 120 by designating the address to be read and the data length received from the AP server 105. Thereafter, the read processing execution portion 4000 waits until the data is sent (Step 5006), and then executes Step 5007 to end the processing.

Step 5010: If the copying flag 2006 is ON, the read processing execution portion 4000 judges whether the address designated by the read request received from the AP server 105 is larger than that of the copy pointer 2007. If the address is larger, the read processing execution portion 4000 executes Step 5009. The processing after Step 5009 is as described above, and therefore a description thereof is omitted herein.

Step 5011: If the address designated by the read request received from the AP server 105 is equal to that of the copy pointer 2007, it means that the region to be read is being copied. Therefore, the read processing execution portion 4000 sets the waiting flag 2011 of the logical volume to be read to ON (1), and then waits the completion of the copy processing. After the copy processing is completed, the read processing execution portion 4000 executes Step 5010 again.

Step 5012: If the address designated by the read request received from the AP server 105 is smaller than that of the copy pointer 2007, the read processing execution portion 4000 judges whether the second SDS ID 2008 is equal to the identifier of the SDS#x (300). If the second SDS ID 2008 is equal to the identifier of the SDS#x (300), the read processing execution portion 4000 executes Step 5001.

Step 5013: If the second SDS ID 2008 is not equal to the identifier of the SDS#x (300), the read processing execution portion 4000 issues a read request to the volume of the SDS 100 specified by the second SDS ID 2008 and the second volume ID 2009 through the network 120. Thereafter, the read processing execution portion 4000 executes Step 5006 and Step 5007 to end the processing.

Figure 15:
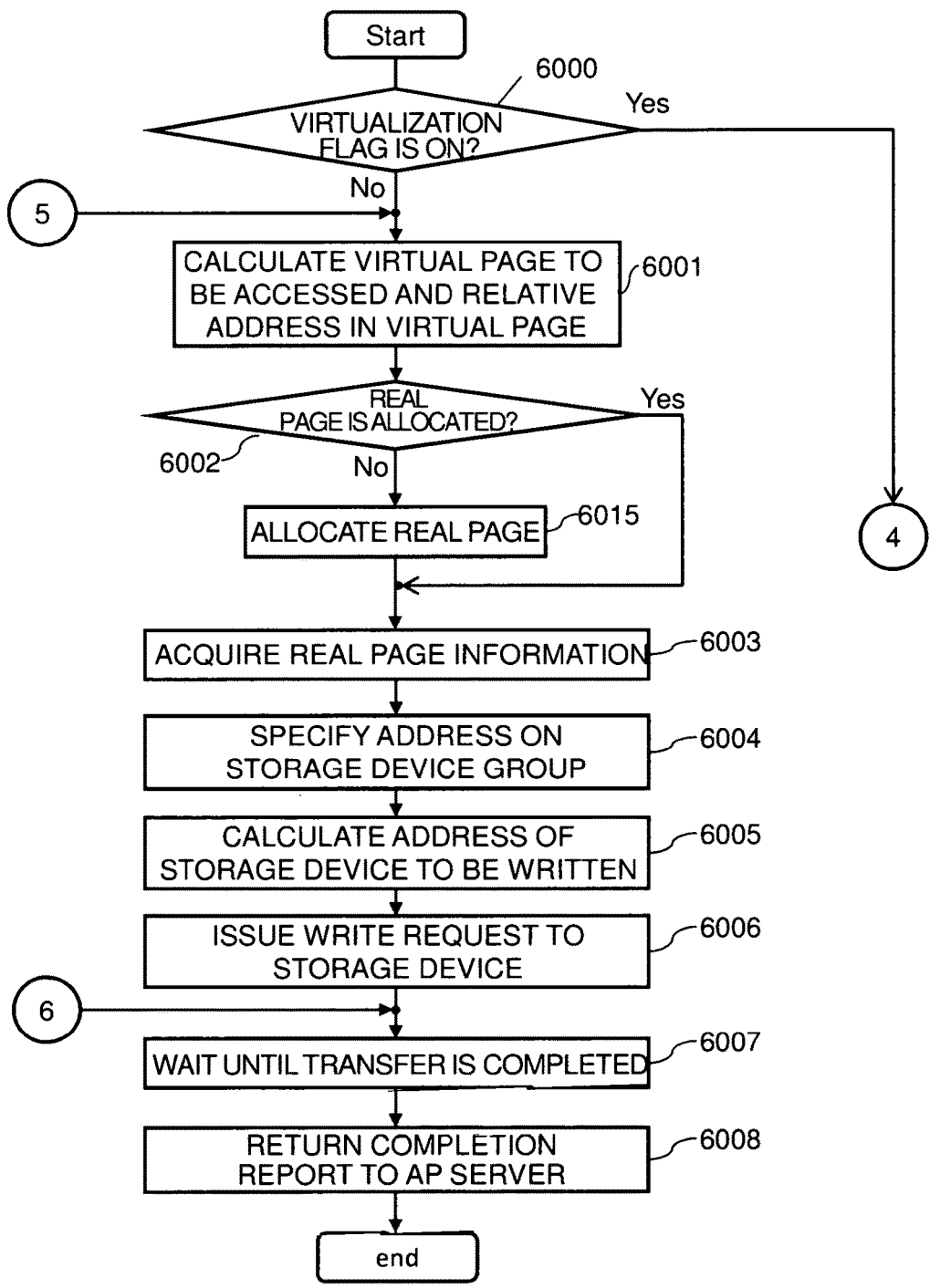
FIG. 15 is a view illustrating a processing flow (1) of a write processing execution portion.
Figure 16:
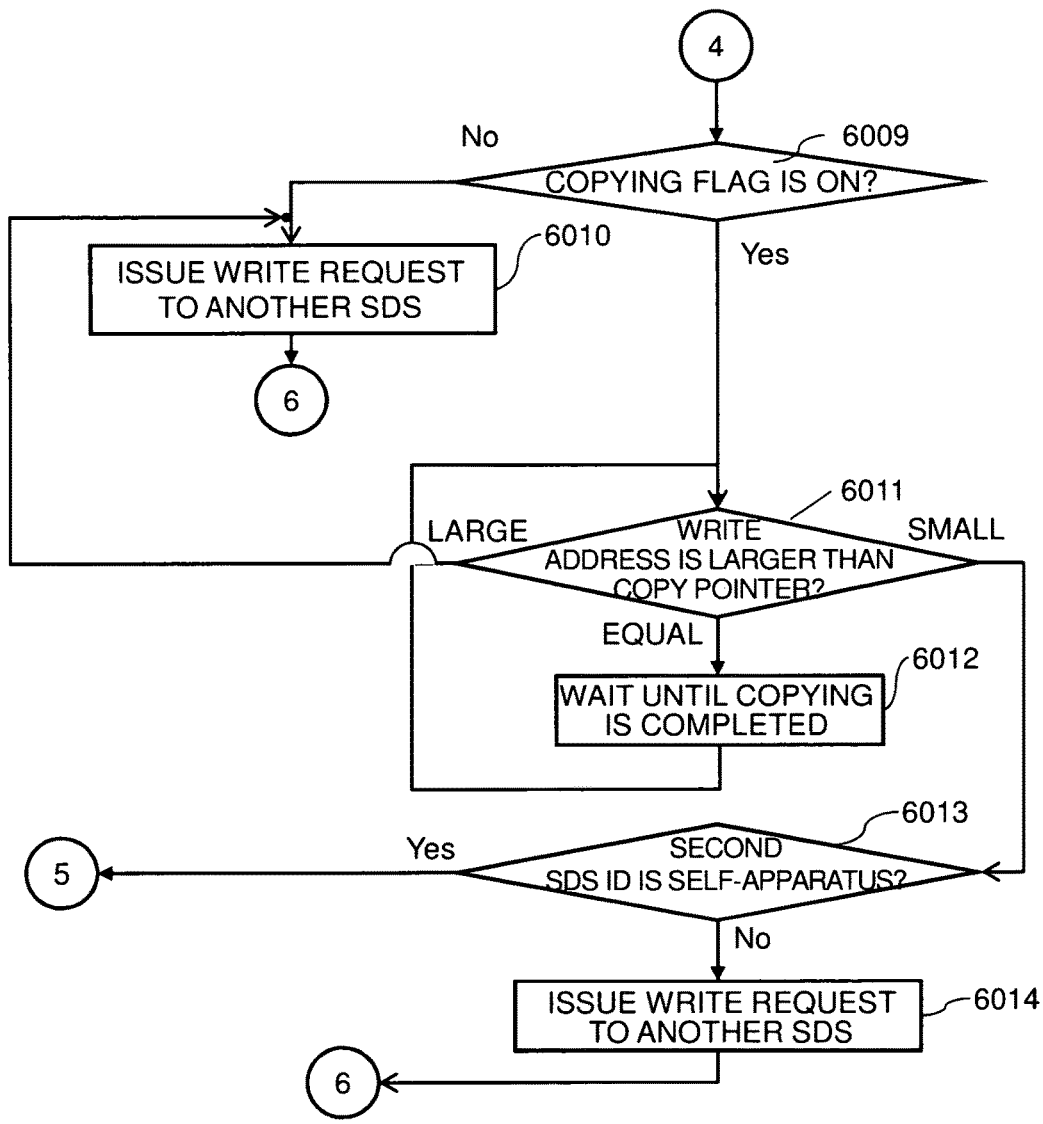
FIG. 16 is a view illustrating a processing flow (2) of the write processing execution portion.

FIG. 15 and FIG. 16 illustrate processing flows of the write processing execution portion 4100. The write processing execution portion 4100 is executed when the SDS#x (300) receives a write request from the AP server 105. In order to avoid complexity of the description, this embodiment describes an example in which a region to be written designated by the write request received from the AP server 105 is within one virtual page.

Step 6000: The write processing execution portion 4100 checks whether the virtualization flag 2003 is ON with reference to the logical volume information 2000 of a logical volume to be written designated by the write request. If the virtualization flag 2003 is ON, Step 6009 is executed next. If the virtualization flag 2003 is OFF, the write processing execution portion 4100 executes Step 6001 next.

Step 6001: The write processing execution portion 4100 calculates a corresponding virtual page and a relative address in the virtual page to be accessed by using the address of a write target designated by the received write request.

Step 6002: In this step, the write processing execution portion 4100 checks whether a real page is allocated to the virtual page serving as the write target. If no real page is allocated to the virtual page, Step 6015 is executed. If a real page is allocated to the virtual page, Step 6015 is skipped.

Step 6015: Herein, a real page is allocated to the virtual page to be written. The allocation of the real page to the virtual page is performed as follows. The write processing execution portion 4100 selects one of the storage device groups 280 whose real page is to be allocated, with reference to the logical volume RAID type 2010 of the logical volume information 2000, the storage device group RAID type 2302 and the number of free real pages 2304 of the storage device group information 2300, and the like. Subsequently, the write processing execution portion 4100 causes the real page pointer 2012 of the virtual page to be written to point the free real page information 2100 located at the top of the free page management information queue 2201 (free real page information 2100 pointed by the free page management information pointer 2200) with reference to the free page management information queue 2201 of the selected storage device group 280.

Moreover, the write processing execution portion 4100 updates the free page management information pointer 2200 so that the free page management information pointer 2200 points a second real page information 2100 (real page information 2100 pointed by the free page pointer 2103 in the real page information 2100 of the real page which has been allocated to the virtual page) in the free page management information queue 2201 and further changes the free page pointer 2103 in the real page information 2100 of the real page allocated to the virtual page to NULL. Moreover, the write processing execution portion 4100 reduces the number of the number of free real pages 2304 of the storage device group information 2300 corresponding to the real page. After the allocation of the real page to the virtual page is performed, Step 6003 is performed.

This embodiment describes the example in which the allocation of a real page to a virtual page is performed when the SDS 100 receives a write request. However, the allocation processing may not necessarily be performed when a write request is received. The allocation processing may be executed by the time the SDS 100 stores data in the storage device 220.

Step 6003: The write processing execution portion 4100 acquires the real page information 2100 of the real page allocated to the virtual page to be written by referring to the real page pointer 2012 of the logical volume information 2000.

Step 6004: The write processing execution portion 4100 specifies a storage device group 280 and the address on the storage device group 280 in which the real page to be written is present by using the storage device group 2101 and the real page address 2102 contained in the acquired real page information 2100. This is the same processing as that of Step 5003.

Step 6005: The write processing execution portion 4100 calculates a relative address in the real page serving as the access target of the request by using the relative address in the virtual page obtained in Step 6001 and the storage device group RAID type 2302. The storage device 220 at the write destination and a write destination address on the storage device 220 are determined from the calculated relative address in the real page, the storage device group RAID type 2302, and the storage device pointer 2305. Moreover, the write processing execution portion 4100 generates a required redundant data, and then determines the storage device 220 storing the redundant data and the address thereof by a known method with reference to the storage device group RAID type 2302.

Step 6006: The write processing execution portion 4100 creates a write request directing the storing of data using the address of the storage device 220 determined in Step 6005, and then issues the same to the storage device 220. Moreover, the write processing execution portion 4100 issues the write request also to the storage device 220 at the storage destination of the redundant data, thereby to perform the writing of the redundant data.

Step 6007: After the write request is issued, the write processing execution portion 4100 waits until a response is returned from the storage device 220.

Step 6008: The write processing execution portion 4100 sends a completion report to the AP server 105.

Step 6009: The write processing execution portion 4100 checks whether the copying flag 2006 is ON. If it is ON, Step 6011 is performed next.

Step 6010: If the copying flag 2006 is OFF, the write processing execution portion 4100 issues a write request designating the received relative address and length to the volume of the SDS 100 specified by SDS ID 2004 and the volume ID 2005 through the network 120. Thereafter, the write processing execution portion 4100 executes Step 6007 and Step 6008 to end the processing.

Step 6011: If the copying flag 2006 is ON, the write processing execution portion 4100 judges whether the address designated by the write request received from the AP server 105 is larger than that of the copy pointer 2007. If the address is larger, the write processing execution portion 4100 executes Step 6010 next. After Step 6010, the write processing execution portion 4100 executes Step 6007 and Step 6008 to end the processing as described above.

Step 6012: If the address designated by the write request received from the AP server 105 is equal to that of the copy pointer 2007, it means that a region to be written is being copied. Therefore, the write processing execution portion 4100 sets the waiting flag 2011 to ON, and then waits until the copy processing of the region to be written is completed. After the copy processing is completed, the write processing execution portion 4100 executes Step 6011 again.

Step 6013: When the address designated by the write request received from the AP server 105 is smaller than that of the copy pointer 2007, the write processing execution portion 4100 judges whether the second SDS ID 2008 is equal to the identifier of the SDS#x (300). If the second SDS ID 2008 is equal to the identifier of the SDS#x (300), the write processing execution portion 4100 executes Step 6001.

Step 6014: If the second SDS ID 2008 is not equal to the identifier of the SDS#x (300), the write processing execution portion 4100 issues a write request to the volume of the SDS 100 designated by the second SDS ID 2008 and the second volume ID 2009 through the network 120. Thereafter, the write processing execution portion 4100 executes Step 6007 and Step 6008 to end the processing.

This embodiment describes the example in which the write processing execution portion 4100 returns a completion report to the AP server 105 after writing data in the storage device 220. However, the write processing execution portion 4100 may return a completion report to the AP server 105 when it finishes writing data in the cache region 240, and then may write data in the storage device 220.

Then, a procedure of the exchange processing of the program of the SDS 100 (SDS#y (301)) performed in the information system according to this embodiment is described with reference to FIG. 17.

A feature of the information system according to this embodiment is realizing program exchange of the SDS 100 in a nonstop manner. By performing the program exchange, a user can freely change (or add) a function to be supported by the SDS 100 according to the intended use. For example, by installing a storage control program capable of supporting the functions equivalent to those of the SDS#x (300) into the SDS#y (301) in which the number of the currently supported functions is less than those of the SDS#x (300), the SDS#y (301) will be able to operate as a storage apparatus having the functions equivalent to those of the SDS#x (300). Thus, the storage environment can be brought into an environment composed of the SDSs of the same type, and therefore a reduction in the management cost and an improvement of the system performance can be achieved.

Herein, an example is described in which the SDS#x (300) has a function (hereinafter referred to as a "mirroring function") of creating a replica (mirror copy) of a volume, for example, as a function not provided in the SDS#y (301) as an example. Moreover, the SDS#x (300) also has the virtualization function as described above.

The mirroring function is used when creating a backup copy of a volume. When the storage apparatus has the mirroring function, the necessity for the AP server 105 to create a replica of data is eliminated, which can reduce the processing load of the AP server 105. The mirroring function can create a replica in the same apparatus as a storage apparatus having the volume of a copy source but can create a replica in another apparatus. An example is described with reference to FIG. 3. The SDS#x (300) can replicate its own logical volume LV0 in its inside (SDS#x (300)), or can replicate the same to another apparatus (for example, SDS#y (301-2)).

When the SDS#x (300) has the mirroring function, a replica of the logical volume LV1 (logical volume using the volume LV2 in the SDS#y (301-1) as the storage region) can also be created (in itself, or into another apparatus). Therefore, in the case where the SDS#y (301) does not have the mirroring function, if a user defines the logical volume the LV1 using the volume LV2 in SDS#y (301) as the storage region in the SDS#x (300), the SDS#x (300) can create a replica of the logical volume LV1 (in itself or into another apparatus) as in the example illustrated in FIG. 3, for example. More specifically, when only one storage apparatus (SDS#x (300) in the example of FIG. 3) having the virtualization function and other various functions is present in the information system, a replica of a volume by the mirroring function can be created by mapping a volume of another storage apparatus (SDS#y (301) in the example of FIG. 3) to the logical volume in the SDS#x (300) having the virtualization function, even when another storage apparatus does not have functions, such as the mirroring function.

However, the configuration of mapping the volumes of a large number of storage apparatus to the logical volumes in the SDS#x (300) by the virtualization function, and further causing the SDS#x (300) to execute the mirroring function and the like places a heavy load on the SDS#x (300), and therefore the performance of the information system is not improved. Therefore, it is preferable for each storage apparatus in the information system to have various functions, such as the mirroring function. The information system according to this embodiment is configured so that, when the SDSs 100 different in the functions provided therein are present, each of the SDSs 100 in the information system has the same function by exchanging the programs of the SDSs 100. This can prevent the concentration of loads on a specific SDS 100, so that an improvement of the performance of the information system can be expected.

When the supported functions of each of the SDSs 100 are different, management methods of each of the SDSs 100 may be different. For example, the types or the formats of management commands (commands exchanged between the management program 150 and the SDS 100) to be supported are different in some cases. In this case, since a user needs to issue different management commands in each of the SDSs 100, the management becomes complicated. When each of the SDSs 100 in the information system has the same function, a user may perform a management operation using the same type of management commands to all the SDSs 100, which facilitates the management.

However, with the storage apparatus of different types, the formats of the data to be stored in the storage device 220 (hereinafter, referred to as a "stored data format") are different in some cases. For example, the address of the volume provided to the initiator by the storage apparatus is not always the same as the address of the storage device in which data is actually stored, and the address of the storage region in which data is actually stored varies depending on the type or the setting of the storage apparatus. The same also applies to the SDS, and the stored data format of the SDS#x (300) is different from the stored data format of the SDS#y (301) in some cases. Therefore, when the program (storage control program) installed in the SDS#y (301) is replaced by a new program, data which was stored in its own storage device 220 by the SDS#y (301) in the past cannot be read in some cases.

Therefore, in the information system according to this embodiment, the program exchange of the SDS#y (301) is performed after the data in the volume in the SDS#y (301) is moved (copied) to the storage device 220 in the SDS#x (300) or the volume in other SDS 100. Hereinafter, the flow of the processing is described with reference to FIG. 17.

The movement destination of the data in the volume of SDS#y (301) is not necessarily limited to the SDS. When a conventional storage apparatus is present in the information system besides the SDS 100, the data in the volume in the SDS#y (301) may be moved (copies) to the volume in the conventional storage apparatus. However, hereinafter, an example is described in which the data in the volume in the SDS#y (301) is moved (copied) to the storage device 220 in the SDS#x (300) or the volume in other SDS 100.

Step 10010: A user transmits a program exchange direction of the SDS#y (301) to the management program 150 executed in the SDS#x (300) using the management server 140. This direction contains the identifier of the storage apparatus (herein, SDS#y (301)) serving as the program exchange target.

Step 10020: When receiving the program exchange direction transmitted from the user in Step 10010, the management program 150 specifies the identifier of the SDS#y (301) contained in the direction. Then, the management program 150 issues a copy processing direction to the copy processing schedule portion 4200 of the SDS#x (300). The copy processing direction contains the identifier of the SDS#y (301).

Step 10030: When the SDS#x (300) receives the copy processing direction from the management program 150, the copy processing schedule portion 4200 starts. The copy processing schedule portion 4200 of the SDS#x (300) specifies the SDS#y (301) contained in the copy processing direction, and then copies the data in the volume(s) owned by the SDS#y (301) to another storage apparatus in the information system. The details of the processing performed in the copy processing schedule portion 4200 are described later. When the processing ends, the copy processing schedule portion 4200 returns the fact that the processing is completed to the management program 150.

Moreover, among the volumes in the storage apparatus (SDS#y's (301)) serving as the program exchange target, volumes which are not necessarily required for a user are present in some cases. In that case, it may be avoided to perform the copy processing of the volume which is not required for the user. Therefore, as another embodiment, when a user directs the program exchange of the SDS#y (301) (Step 10010), the identifier of the volume to be subjected to the copy processing (or identifier of the volume which does not need to be subjected to the copy processing) in addition to the identifier of the SDS#y (301) may also transmitted to the management program 150. Then, the management program 150 may notify the identifier of the volume to be subjected to the copy processing to the copy processing schedule portion 4200 and may cause the copy processing schedule portion 4200 to perform the copy processing of only the volume to be subjected to the copy processing.

Step 10040: When receiving the response indicating that the processing is completed from the copy processing schedule portion 4200, the management program 150 issues a program exchange direction to the SDS#y (301) designated by a user in Step 10010. Herein, the management program 150 also transmits a program for exchange to be installed in the SDS#y (301). The program to be installed in the SDS#y (301) may be passed to the management program 10020 from the management server 140 in Step 10010, for example. Or, in Step 10040, the management program 150 may acquire a program from the management server 140, and then transmit the same to the SDS#y (301).

Or, when a user wants to install the same program as the program (storage control program 130) executed in the SDS#x (300) into the SDS#y (301), the user may direct the management program 150 to install the program which is executed in the SDS#x (300) (in Step 10010 or Step 10040). In that case, the management program 150 reads the storage control program 130 stored in the storage device 220 (or main memory 210) in the SDS#x (300), and then transmits the same to the SDS#y (301).

Step 10050: When receiving the installation directions (and program) from the management program 150 of the SDS#x (300), the SDS#y (301) starts the execution of the installation program 250 of the SDS#y (301). The installation program 250 installs the program received from the management program 150, and the installation program 250 notifies the end of the installation processing to the management program 150 when the installation processing is completed. Thereafter, the SDS#y (301) may execute restart, for example, to start the execution of the program received from the management program 150.

When receiving the notification of the end of the installation processing from the installation program 250 of the SDS#y (301), the management program 150 notifies that the processing is completed to the management server 140 to end the processing.

At the point of time when the program exchange processing described above ends, the data which was stored in the SDS#y (300) before the program exchange is saved (stored) in another storage apparatus (SDS#x (300) or SDS other than the SDS#y (301) subjected to the program exchange). A user may return the saved data to the SDS#y (301) subjected to the program exchange. In that case, a user may define a volume in the SDS#y (301), and then copy the saved data in the defined volume.

By performing such processing, the information system according to this embodiment can freely change the program of each of the SDSs 100 according to the intended use of a user without losing data.

Figure 17:
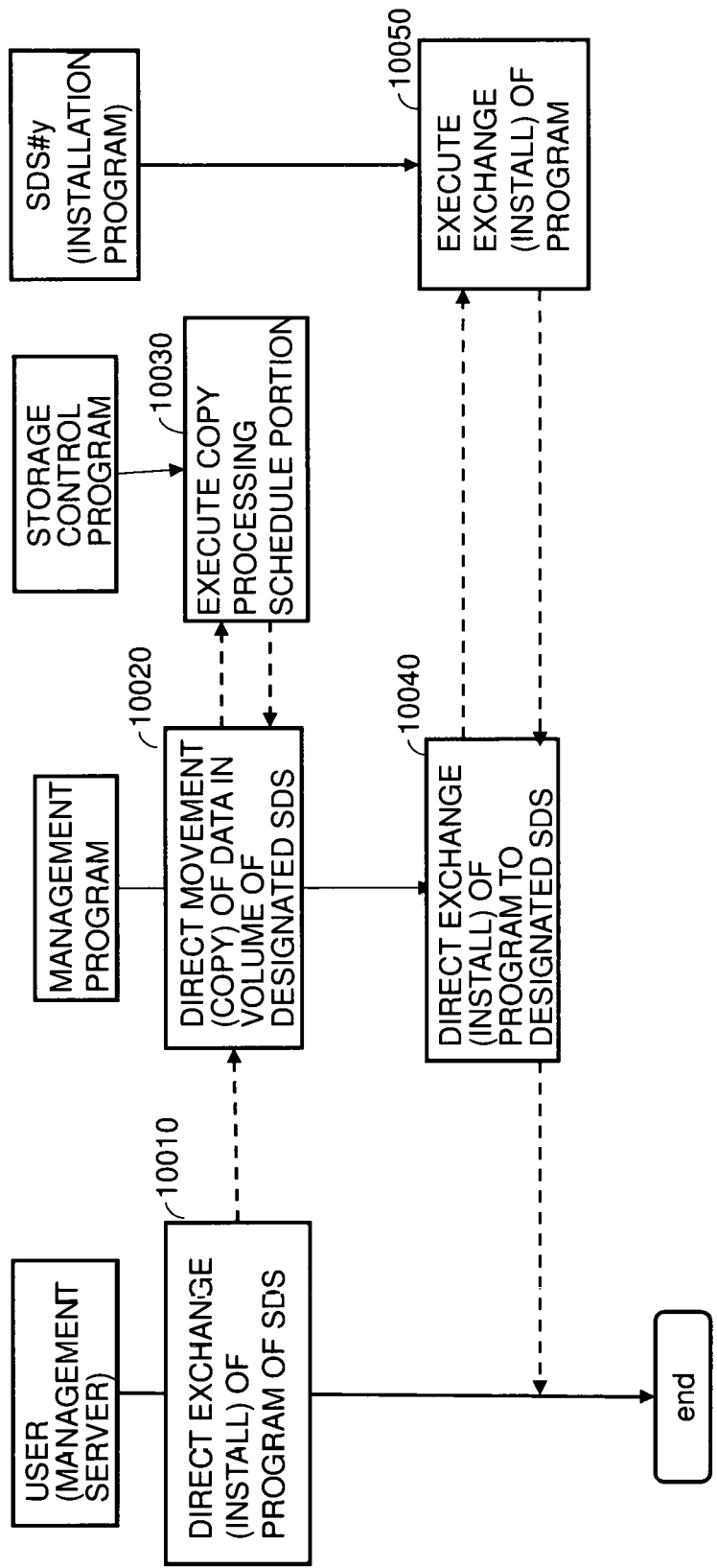
FIG. 17 is a view illustrating a procedure of program exchange processing.
Figure 18:
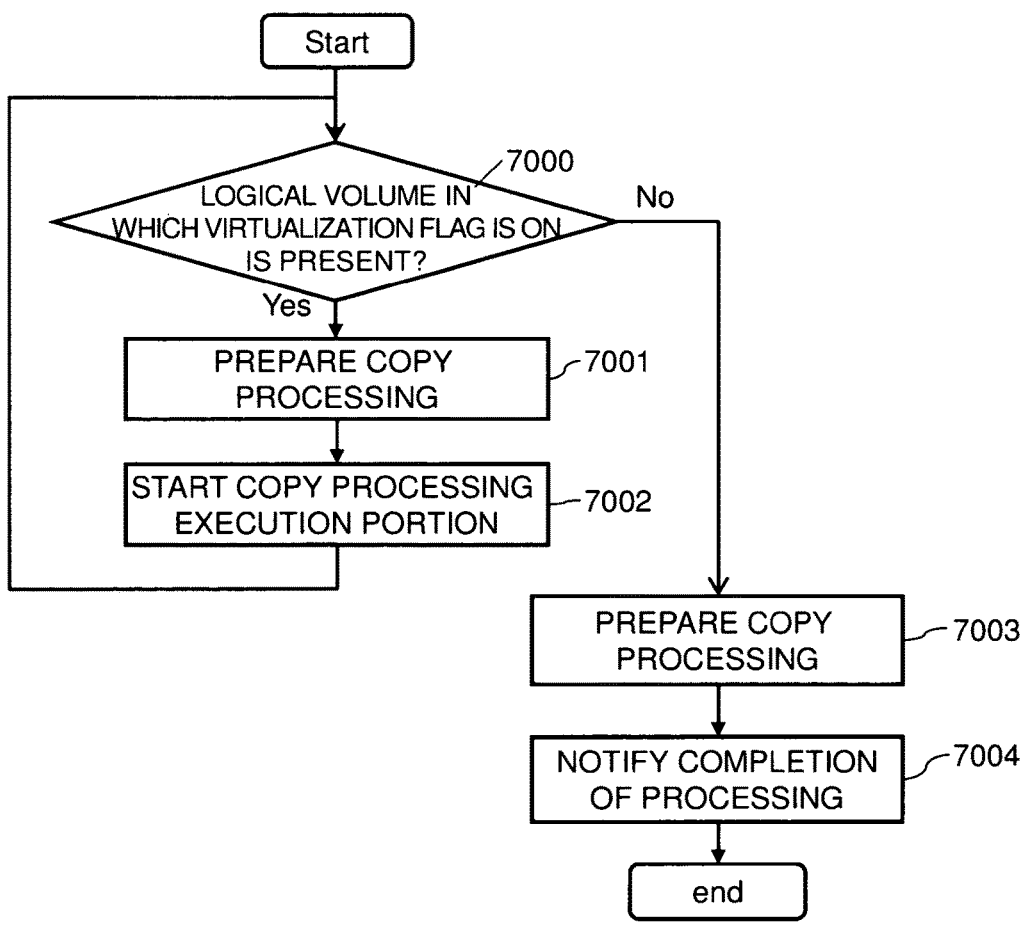
FIG. 18 is a view illustrating a processing flow of a copy processing schedule portion.

FIG. 18 illustrates a processing flow of the copy processing schedule portion 4200 to be executed in Step 10030 described in FIG. 17. The copy processing schedule portion 4200 schedules processing of copying the data in the volume in the SDS 100 designated by the management program 150 in another SDS 100. The data copy destination may be the storage device 220 in the SDS#x (300) or may be a volume defined in the SDS 100 other than the designated SDS 100.

Step 7000: The copy processing schedule portion 4200 finds, among the pieces of the logical volume information 2000, one in which the virtualization flag 2003 is ON and in which the SDS ID 2004 matches with the designated SDS 100. Unless it is found, the copy processing schedule portion 4200 jumps to Step 7003 in order to wait the completion of the copy processing because it means that all the logical volumes were found.

Step 7001: If the logical volume satisfying the conditions is found in Step 7000, the copy processing schedule portion 4200 performs preparation for performing copy processing of the found logical volume. Specifically, the copy processing schedule portion 4200 sets the copying flag 2006 of the found logical volume to ON. Then, the copy processing schedule portion 4200 determines the data copy destination SDS 100. An arbitrary method may be used for a method for determining the copy destination. For example, an SDS 100 having the largest free region may be selected as the copy destination.

In copying (saving) data into the SDS 100 other than the SDS#x (300), the copy processing schedule portion 4200 refers to the logical volume capacity 2002 of the logical volume found in Step 7000, and defines a volume in another SDS 100 having the same size (or larger size than) as the logical volume capacity 2002. Moreover, in copying data into the storage device 220 in the SDS#x (300), the copy processing schedule portion 4200 checks whether a larger number of free real pages as compared with the logical volume capacity 2002 of the found logical volume are present.

When a volume is to be defined in another SDS 100, the copy processing schedule portion 4200 may execute the volume definition processing by exchange information with the SDS 100 serving as a volume definition destination through the network 120. Or, the copy processing schedule portion 4200 may request the management program 150 to define a volume, and the management program 150 may determine an SDS 100 in which the volume is defined, cause the SDS 100 to define the volume having the designated capacity, and then return the identifier of the SDS 100 and the identifier of the logical volume to the SDS#x (300).

When the data copy destination is the storage device 220 in the SDS#x (300), the copy processing schedule portion 4200 sets the identifier of the SDS#x (300) to the second SDS ID 2008. On the other hand, when the data copy destination is the volume in another SDS 100, the copy processing schedule portion 4200 sets the identifier of the SDS 100 having the copy destination volume to the second SDS ID 2008 and sets the identifier of the copy destination volume to the second volume ID 2009. Furthermore, the copy processing schedule portion 4200 sets an initial value (0) to the copy pointer 2007.

Step 7002: The copy processing schedule portion 4200 starts the copy processing execution portion 4300. Herein, the copy processing schedule portion 4200 designates the logical volume information 2000 of the logical volume serving as the copy processing target. Thereafter, the copy processing schedule portion 4200 executes Step 7000 again in order to search for the following logical volume.

Herein, the copy processing schedule portion 4200 does not need to wait until the processing of the copy processing execution portion 4300 ends, and may return to Step 7000 immediately after starting the copy processing execution portion 4300. Specifically, when starting the copy processing execution portion 4300, the copy processing schedule portion 4200 generates a process in which the copy processing execution portion 4300 is executed to cause the process to execute the copy processing execution portion 4300, and then the copy processing schedule portion 4200 executes Step 7000 again.

Two or more of the processes in which the copy processing execution portion 4300 is executed may be generated. When two or more of the processes are generated, the processes can be executed in parallel. Therefore, a process of performing copy processing for the first logical volume and a process of performing copy processing for the second logical volume may be carried out in parallel, for example.

Step 7003: The copy processing schedule portion 4200 waits until the copy processing of all the logical volumes executed in Step 7000 to Step 7002 is completed.

Step 7004: The copy processing schedule portion 4200 reports that the copy processing of the logical volume of the designated SDS 100 is completed to the management program 150 to end the processing. Although the example in which the copy processing of all the volumes of the designated SDS 100 is scheduled is described above, the copy processing schedule portion 4200 may receive the identifier of a volume requiring the copy processing from a user to perform the copy processing of only the volume requiring the copy processing described above.

Figure 19:
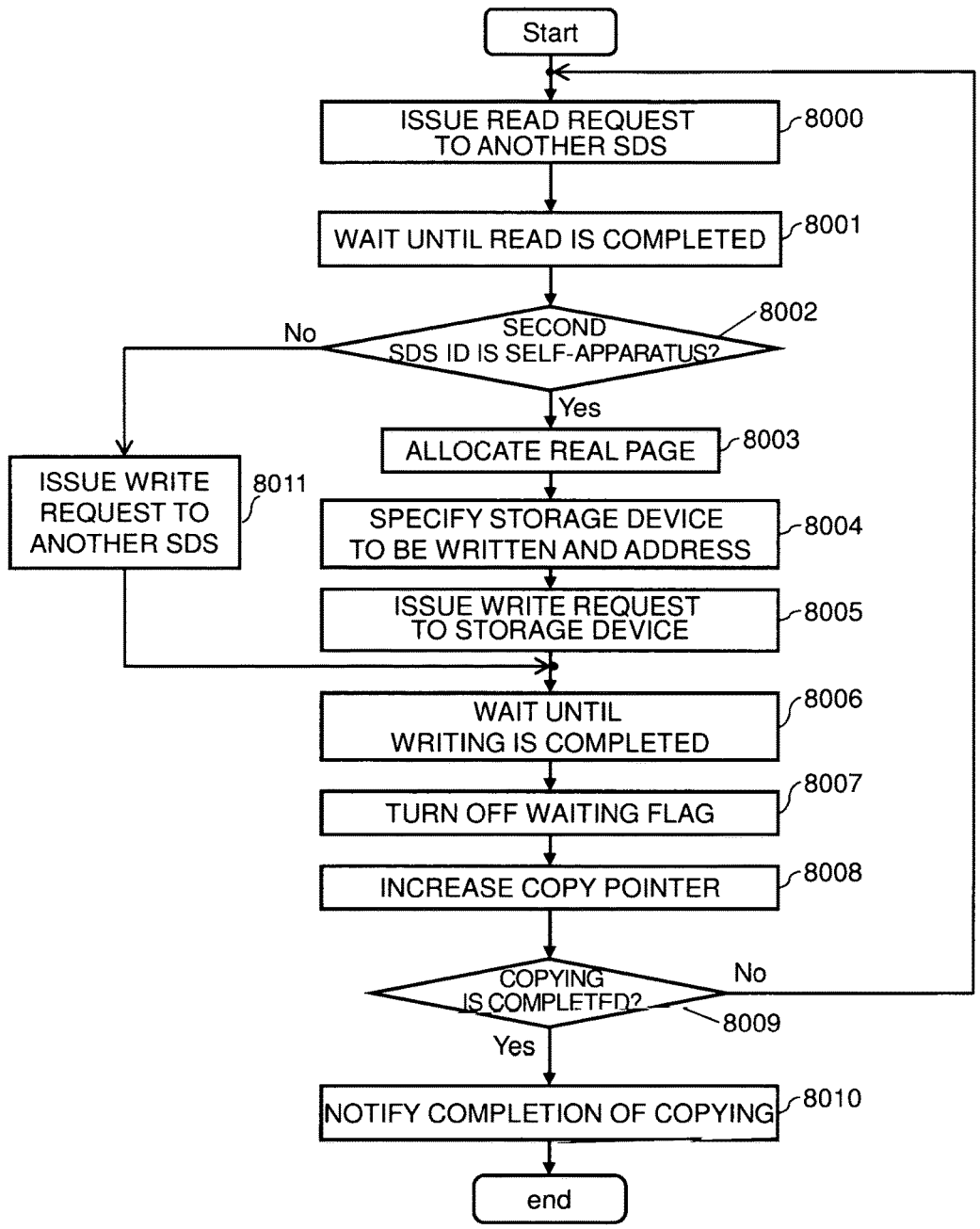
FIG. 19 is a view illustrating a processing flow of the copy processing execution portion.

FIG. 19 illustrates a processing flow of the copy processing execution portion 4300. The copy processing execution portion 4300 starts the execution when it is called from the copy processing schedule portion 4200 (Step 7002). When the copy processing schedule portion 4200 calls the copy processing execution portion 4300, the logical volume as the copy processing target is designated. The copy processing execution portion 4300 executes the copy processing for the designated logical volume.

Step 8000: By referring to the copy pointer 2007, the SDS ID 2004, and the volume ID 2005 of the designated logical volume, the copy processing execution portion 4300 issues, to the corresponding SDS 100, a read request for reading data designating a logical volume, a read start address, and the capacity of one virtual page. Although this embodiment describes the example in which, when the copy processing execution portion 4300 performs the copy processing, the copying is performed in a virtual page unit, the copy processing may be performed in the other units.

Step 8001: The copy processing execution portion 4300 waits until data is sent from the SDS 100 to which the read request is issued in Step 8000.

Step 8002: The copy processing execution portion 4300 checks whether the second SDS ID 2008 is the SDS#x (300). Otherwise, the copy processing execution portion 4300 performs Step 8011 next. If the second SDS ID 2008 is the SDS#x (300), Step 8003 is performed next.

Step 8003: The copy processing execution portion 4300 allocates a real page to a virtual page corresponding to an address specified by the copy pointer 2007. The processing is the same processing as that of Step 6015.

Step 8004: The processing performed herein is the same processing as those of Steps 6004 and 6005. The copy processing execution portion 4300 specifies the address of the storage device 220 in which a data write destination real page is present, by using the storage device group RAID type 2302 and the storage device pointer 2305. Moreover, the copy processing execution portion 4300 generates required redundant data by a known method with reference to the storage device group RAID type 2302, and then calculates the storage device 220 storing the redundant data and the address thereof.

Step 8005: The processing performed herein is the same processing as that of Step 6006. The copy processing execution portion 4300 issues a write request of storing data and redundant data to the storage device 220 at a data storage destination and the storage device 220 at a redundant data storage destination specified in Step 8004, and then transfers the data and the redundant data. Thereafter, the copy processing execution portion 4300 performs Step 8006.

Step 8011: If the second SDS ID 2008 is not the SDS#x (300), the copy processing execution portion 4300 issues a write request to the corresponding SDS 100 designating a logical volume, a read start address, and the capacity of one page, by referring to the copy pointer 2007, the second SDS ID 2008, and the second volume ID 2009, and it sends data to be written. Thereafter, the copy processing execution portion 4300 performs Step 8006.

Step 8006: The copy processing execution portion 4300 waits until a response is returned from the storage device 220 (or another SDS 100).

Step 8007: With reference to the waiting flag 2011, the copy processing execution portion 4300 releases the waiting state of the processing which is waiting when the waiting flag 2011 is ON, and then sets the waiting flag 2011 to OFF.

Step 8008: The copy processing execution portion 4300 advances the copy pointer 2007 corresponding to one page.

Step 8009: The copy processing execution portion 4300 checks whether the copy pointer 2007 exceeds the end address of the logical volume (i.e., whether the copy of the logical volume is completed) with reference to the copy pointer 2007 and the logical volume capacity 2002. If the copy of the logical volume is not completed, the copy processing execution portion 4300 repeats the processing from Step 8000 again.

Step 8010: If the copy of the logical volume is completed, the copy processing execution portion 4300 sets the copying flag 2006 to OFF. Furthermore, the copy processing execution portion 4300 sets the virtualization flag 2003 to OFF if the second SDS ID 2008 is the identifier of the SDS#x (300). If the second SDS ID 2008 is not the identifier of the SDS#x (300), the copy processing execution portion 4300 copies the second SDS ID 2008 and the second volume ID 2009 to the SDS ID 2004 and the volume ID 2005 to end the processing.

The copy processing execution portion 4300 performs the processing described above to thereby move (copy) the data of one logical volume to another storage region. Also during the copy processing by the copy processing execution portion 4300, the read processing execution portion 4000 or the write processing execution portion 4100 can execute data read processing or write processing of the logical volume. The read processing execution portion 4000 is configured so as to perform particularly the processing illustrated in FIG. 14 (Step 5008 to Step 5013), and therefore, even when the logical volume to be read is under the copy processing by the copy processing execution portion 4300, the read processing execution portion 4000 can read data without waiting the completion of the execution of the copy processing of the copy processing execution portion 4300. Moreover, the write processing execution portion 4100 can similarly write data without waiting the completion of the execution of the copy processing of the copy processing execution portion 4300 by performing the processing illustrated in FIG. 16. Therefore, a user can perform program exchange of the SDS#y (301) without stopping the operation (without stopping the access to the logical volume from the AP server 105, for example).

The embodiments of the present invention are described above but the embodiments are merely examples for the description of the present invention and it is not intended that the scope of the present invention is limited only to the embodiments. More specifically, the present invention can be carried out in other various aspects.

In the embodiments described above, the SDS#x (300) executes the management program 150 and manages each storage apparatus (SDS) in the information system but the management program 150 may not necessarily be executed in the SDS#x (300). For example, a configuration may be acceptable in which the management server 140 executes the management program 150, whereby the management server 140 manages each of the SDSs 100 in the information system. Or, a configuration may be acceptable in which the management program 150 is executed in the AP server 105.

In the embodiments described above, the server computer is present for each intended use (SDS 100, AP server 105, management server 140) but a configuration may be acceptable in which one server computer functions for a plurality of intended uses. For example, the client program executed by the management server 140 in the embodiments described above may be configured so as to be executed in the SDS 100. In this case, a user performs a management operation using input/output devices (keyboard and display) provided in the SDS 100.

Or, the information system may be configured so that the application programs and the storage control program 130 are executed by the same server computer. In that case, the server computer functions as both the AP server and the SDS in the embodiments described above.

Moreover, in this case, a configuration may be acceptable in which a plurality of virtual computers is defined on the server computer and the application programs and the storage control program are executed on the virtual computers. For example, by executing a hypervisor on the server computer, a virtual computer executing the application programs and a virtual computer executing the storage control program are defined. Then, the virtual computer executing the storage control program may be configured so as to provide a volume in the virtual computer (or server computer other than the virtual computer and the like) executing the application programs. However, each program may not necessarily be executed on the virtual computer. For example, a configuration may be acceptable in which a program code performing processing equivalent to the storage control program described above is included in a hypervisor, and then the server computer executes the hypervisor, whereby a volume is provided to the virtual computer executing the application programs.

A part of the processing described above may be done manually. For example, in the processing described with reference to FIG. 17, the management program 150 directs the copy processing schedule portion 4200 to execute Step 10030, and then directs the SDS 100 (SDS#y (301)) which is the program exchange target to exchange programs. A user may perform a part of the processing. More specifically, a user may exchange programs of the SDS#y (301) after the user can confirm the end of Step 10030 (data movement of the SDS#y (301)).

With respect to the program exchange herein, a user may direct the program installation into the SDS#y (301) to the management program 150 of the SDS#x (300) from the management server 140 to thereby cause the installation program 250 of the SDS#y (301) to perform the program exchange from the management program 150 or may directly direct the installation of a program to the installation program 250 of the SDS#y (301) from the management server 140. Or, when the SDS#y (301) has input/output devices, such as a keyboard and a display, a user may direct the installation of a program to the SDS#y (301) using the same.

The embodiments described above describe the example in which the I/O request (command) received by the SDS is a so-called SCSI command. More specifically, the example is described in which the SDS is the storage apparatus receiving a so-called block level access request. However, the SDSs may be storage apparatus of the other types. For example, storage apparatus receiving access requests of a file level or an object level (so-called Network Attached Storage (NAS) or Object-based Storage Device) (OSD)) and the like may be acceptable.

The embodiments described above describe the example in which, when the data in the logical volume is moved to the storage region other than the SDS#y (301) by the copy processing execution portion 4300, the storage region at the movement destination is the storage device in the SDS#x (300) or any one of the volumes owned by the other SDSs 100. However, both the storage device of the SDS#x (300) and the volumes in the other SDSs 100 may be used for the storage region at the movement destination.

For example, when the program exchange of the SDS#y (301-1) is performed in the SDS#x (300), SDS#y (301-1), and SDS#y (301-2) illustrated in FIG. 3, the data stored in the LV2 needs to be moved to the SDSs other than the SDS#y (301-1) (The LV2 is mapped to the LV1 by the virtualization function.). In this case, the SDS#x (300) may move some data of the data stored in the LV2, e.g., the half of the data from the top of the LV2, to the storage devices 220 in the SDS#x (300) and may move the remaining data to the volume LV3 in the SDS#y (301-2), for example. It is a matter of course that, in this case, the SDS#x (300) needs to be configured so as to be able to allocate the storage regions of a different volume (or storage regions of the storage device 220) to each region (for example, virtual page) of the logical volume.

Moreover, the programs causing the CPU to execute the processing described above may be provided in a state of being stored in storage media readable by a computer, and may be installed in each apparatus executing the program. The storage media readable by a computer are non-transitory computer readable media, for example, nonvolatile storage media such as IC card, SD card, and DVD. Or, the programs causing the CPU to execute the processing described above may be provided through a network from a program distribution server.

DESCRIPTION OF REFERENCE NUMERALS

100: SDS
105: AP server
120: Network
130: Storage control program
140: Management server
150: Management program
200: Processor
210: Main memory
220: Storage device
230: Management information
240: Cache region
250: Installation program

The invention claimed is:

1. An information system comprising a plurality of computers,
wherein each of the plurality of computers has at least one processor, at least one memory, and at least one storage device,
wherein the plurality of computers contains a first computer executing a first storage control program and a management program, and a second computer executing a second storage control program,
wherein the second storage control program is configured to cause the at least one processor of the second computer to define a first volume using the at least one storage device in the second computer as a storage region,
wherein the first storage control program is configured to cause the at least one processor of the first computer to define logical volumes, which include a first logical volume using the at least one storage device in the first computer as a first storage region and a second logical volume using the first volume provided by the second computer as a second storage region, and
wherein the management program is configured to cause the at least one processor of the first computer to execute:
a first step of receiving a direction to install a program for exchange to the second computer and specifying a logical volume using a storage region provided by the second computer, among the logical volumes of the first computer,
a second step of moving data stored in the first volume defined in the second computer to the at least one storage device in the first computer, the first volume being used as the second storage region of the second logical volume which is the logical volume specified in the first step, and
a third step of causing the second computer to install the program for exchange after confirming completion of the second step.

2. The information system according to claim 1, wherein in response to receiving a first I/O request to the second storage region of the second logical volume before the execution of the second step, the first storage control program is configured to cause the at least one processor of the first computer to convert the first I/O request into a second I/O request to the first volume, which is used as the second storage region of the second logical volume, and issue the second I/O request to the second computer.

3. The information system according to claim 1,
wherein the second step includes a step of changing a configuration of the second logical volume so that the at least one storage device in the first computer is used as a storage region of the second logical volume after the data stored in the first volume is moved to the at least one storage device in the first computer, and
wherein the second step can be executed in parallel with processing relating to an I/O request to the second logical volume.

4. The information system according to claim 1,
wherein the plurality of computers contains a third computer executing a third storage control program,
wherein the third storage control program is configured to cause the at least one processor of the third computer to define a second volume using the at least one storage device in the third computer as a storage region, and
wherein the second step further includes:
a step of moving at least a part of data stored in the first volume of the second computer to the second volume of the third computer, remaining data among data stored in the first volume is moved to the at least one storage device in the first computer, and a step of changing a configuration of the second logical volume so that the second volume of the third computer and the at least one storage device in the first computer are used as a storage region of the second logical volume.

5. The information system according to claim 1, wherein the direction to install the program for exchange to the second computer includes an identifier of the second computer.

6. The information system according to claim 1, wherein the program for exchange is a same program as the first storage control program.

7. An information system comprising a plurality of computers,
wherein the plurality of computers includes a first computer and a second computer, each of the first computer and the second computer has at least one processor executing a storage control program, at least one memory, and at least one storage device,
wherein the second computer is configured to define volumes using the at least one storage device in the second computer as a storage region, by executing a second storage control program,
wherein the first computer is configured to define logical volumes, which include a first logical volume using the at least one storage device in the first computer as a first storage region and a second logical volume using at least one of the volumes provided by the second computer as a second storage region, by executing a first storage control program, and
wherein at least one of the plurality of computers is configured to execute:
a first step of receiving a direction to install a program for exchange to the second computer,
a second step of moving data stored in a first volume of the volumes defined in the second computer to at least one other computer of the plurality of computers other than the second computer, the first volume being used as the second storage region of the second logical volume, which is specified as a logical volume using a storage region provided by the second computer among the logical volumes of the first computer, and
a third step of causing the second computer to install the program for exchange after confirming completion of the second step.

8. The information system according to claim 7, wherein in response to receiving a first I/O request to the second storage region of the second logical volume before the execution of the second step, the first storage control program is configured to cause the at least one processor of the first computer to convert the first I/O request into a second I/O request to the first volume, which is used as the second storage region of the second logical volume, and issue the second I/O request to the second computer.

9. The information system according to claim 7, wherein the second step includes a step of moving data stored in the first volume defined in the second computer to the at least one storage device in the first computer.

10. The information system according to claim 9,
wherein the second step includes a step of changing a configuration of the second logical volume so that at least one storage device in the first computer is used as a storage region of the second logical volume after the data stored in the first volume is moved to the at least one storage device in the first computer, and
wherein the second step can be executed in parallel with processing relating to an I/O request to the second logical volume.

11. The information system according to claim 7,
wherein the plurality of computers includes a third computer, the third computer has at least one processor executing a third storage control program, at least one memory, and at least one storage device,
wherein the third storage control program is configured to cause the at least one processor of the third computer to define a second volume using the at least one storage device in the third computer as a storage region, by executing a third storage control program, and
wherein the second step further includes:
a step of moving at least a part of data stored in the first volume of the second computer to the second volume of the third computer, and moving remaining data among data stored in the first volume to the at least one storage device in the first computer, and
a step of changing a configuration of the second logical volume so that the second volume of the third computer and the at least one storage device in the first computer are used as a storage region of the second logical volume.

12. The information system according to claim 7,
wherein the plurality of computers includes a third computer, the third computer has at least one processor executing a third storage control program, at least one memory, and at least one storage device,
wherein the third storage control program is configured to cause the at least one processor of the third computer to define a second volume using the at least one storage device in the third computer as a storage region, by executing a third storage control program, and
wherein the second step further includes:
a step of moving at least a part of data stored in the first volume of the second computer to the second volume of the third computer, and
a step of changing a configuration of the second logical volume so that the second volume of the third computer is used as a storage region of the second logical volume.

13. The information system according to claim 7, wherein the direction to install the program for exchange to the second computer includes an identifier of the second computer.

14. The information system according to claim 7, wherein the program for exchange is a same program as the first storage control program.

15. The information system according to claim 7, wherein the program for exchange is a storage control program having same function as the first storage control program.

16. The information system according to claim 7, wherein a first computer is configured to execute the first step, the second step, and the third step.

17. A method for exchanging a program in an information system including a plurality of computers,
wherein the plurality of computers includes a first computer and a second computer, each of the first computer and the second computer has at least one processor executing a program, at least one memory, and at least one storage device,
wherein the second computer is configured to define volumes using the at least one storage device in the second computer as a storage region, by executing a second storage control program, wherein the first computer is configured to define logical volumes, which include a first logical volume using the at least one storage device in the first computer as a first storage region and a second logical volume using at least one of the volumes provided by the second computer as a second storage region, by executing a first storage control program, and wherein at least one of the plurality of computers is configured to execute:

a first step of receiving a direction to install a storage control program to the second computer, a second step of moving data stored in a first volume of the volumes defined in the second computer to at least one other computer of the plurality of computers other than the second computer, the first volume being used as the second storage region of the second logical volume, which is specified as a logical volume using a storage region provided by the second computer among the logical volumes of the first computer, and a third step of causing the second computer to install the storage control program after confirming completion of the second step.

18. The method according to claim 17, wherein the second step includes a step of moving at least a part of data stored in the first volume defined in the second computer to the at least one storage device in the first computer.

19. The method according to claim 17, wherein the plurality of computers includes a third computer, the third computer has at least one processor executing a third storage control program, at least one memory, and at least one storage device, wherein the third storage control program is configured to cause the at least one processor of the third computer to define a second volume using the at least one storage device in the third computer as a storage region, by executing a third storage control program, and wherein the second step further includes a step of moving at least a part of data stored in the first volume of the second computer to the second volume of the third computer.

20. The method according to claim 19, wherein the second step further includes:

a step of moving remaining data among data stored in the first volume to the at least one storage device in the first computer, and a step of changing a configuration of the second logical volume so that the second volume of the third computer and the at least one storage device in the first computer are used as a storage region of the second logical volume.

21. The method according to claim 17, wherein the direction to install the storage control program to the second computer includes an identifier of the second computer.

22. The method according to claim 17, wherein the storage control program is a same program as the first storage control program.

23. The method according to claim 17, wherein the storage control program has same function as the first storage control program.

24. A method for exchanging a program in an information system including a plurality of computers, wherein each of the plurality of computers has at least one processor, at least one memory, and at least one storage device, wherein the plurality of computers contains a first computer executing a first storage control program and a management program, and a second computer executing a second storage control program, wherein the second storage control program is configured to cause the at least one processor of the second computer to define a first volume using the at least one storage device in the second computer as a storage region, and wherein the first storage control program is configured to cause the at least one processor of the first computer to define logical volumes, which include a first logical volume using the at least one storage device in the first computer as a first storage region and a second logical volume using the first volume provided by the second computer as a second storage region, the method performed by the at least one processor of the first computer and comprising the steps of:

receiving a direction to install a program for exchange to the second computer and specifying a logical volume using a storage region provided by the second computer, among the logical volumes of the first computer, moving data stored in the first volume defined in the second computer to the at least one storage device in the first computer, the first volume being used as the second storage region of the second logical volume which is the logical volume that is specified, and causing the second computer to install the program for exchange after confirming completion of the step of moving data.

* * * * *